(12) United States Patent
Mori et al.

(10) Patent No.: US 7,742,853 B2
(45) Date of Patent: Jun. 22, 2010

(54) TRAVEL CONTROL DEVICE AND METHOD FOR VEHICLES

(75) Inventors: Masaki Mori, Kanagawa (JP); Tsugio Sudou, Kanagawa (JP); Akiharu Nishijima, Kanagawa (JP); Masanori Tojima, Kanagawa (JP); Kazunori Kuromoto, Kanagawa (JP); Koji Takeda, Kanagawa (JP); Tomonori Ozaki, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 822 days.

(21) Appl. No.: 11/636,133

(22) Filed: Dec. 8, 2006

(65) Prior Publication Data

US 2007/0293996 A1     Dec. 20, 2007

(30) Foreign Application Priority Data

Dec. 9, 2005    (JP)   ............................. 2005-356673

(51) Int. Cl.
G01C 21/26     (2006.01)
G05D 1/02      (2006.01)

(52) U.S. Cl. ........................... 701/24; 701/117; 701/301

(58) Field of Classification Search ........................ None
See application file for complete search history.

(56) References Cited

U.S. PATENT DOCUMENTS

| | | | | |
|---|---|---|---|---|
| 5,625,559 A * | 4/1997 | Egawa | ......................... | 701/117 |
| 6,038,502 A * | 3/2000 | Sudo | ............................ | 701/23 |
| 6,246,932 B1 * | 6/2001 | Kageyama et al. | ............ | 701/24 |
| 6,393,362 B1 * | 5/2002 | Burns | .......................... | 701/301 |
| 6,480,769 B1 * | 11/2002 | Kageyama | ..................... | 701/23 |
| 2004/0143375 A1 * | 7/2004 | Sudou | ........................ | 701/23 |

FOREIGN PATENT DOCUMENTS

| | | |
|---|---|---|
| JP | 09-231500 | 9/1997 |
| JP | 2001-109519 | 5/1999 |
| JP | 11-242520 | 9/1999 |
| JP | 2000-339029 | 12/2000 |

OTHER PUBLICATIONS

Notice mailed on Aug. 26, 2009 from the Japanese Patent Office for Patent No. 2005-356673.

* cited by examiner

*Primary Examiner*—Michael J. Zanelli
(74) *Attorney, Agent, or Firm*—Husch Blackwell Sanders Welsh & Katz

(57) ABSTRACT

A restricted area (60) is created based on positional information of a manned vehicle (20) traveling one of outward/return lanes (51, 52), and a detour course (72) is created based on information of the restricted area (60). Information on the detour course (72) is provided to the unmanned vehicles (10, 11) and the manned vehicle (20). Based on the positional information of the unmanned vehicles (10, 11) which proceed towards each other from the opposite directions with the restricted area (60) therebetween, the unmanned vehicle (11) on the lane (52) which is the opposite side of the restricted area (60) is blocked at a block position (61B) and at the same time a travel permission command for permitting traveling the detour course (72) is issued to the unmanned vehicle (10) traveling the lane (51) on the restricted area side so that the unmanned vehicle (10) travels the detour course (72).

6 Claims, 11 Drawing Sheets

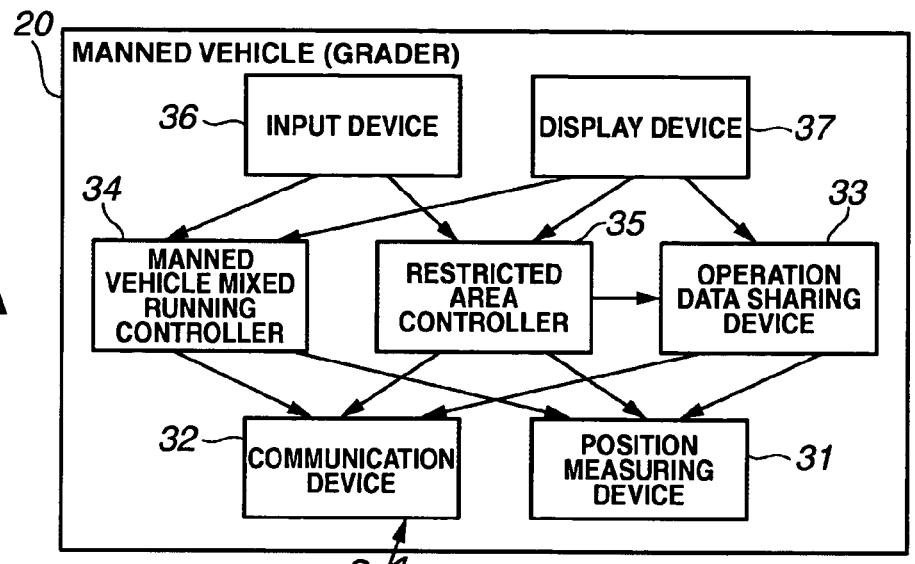
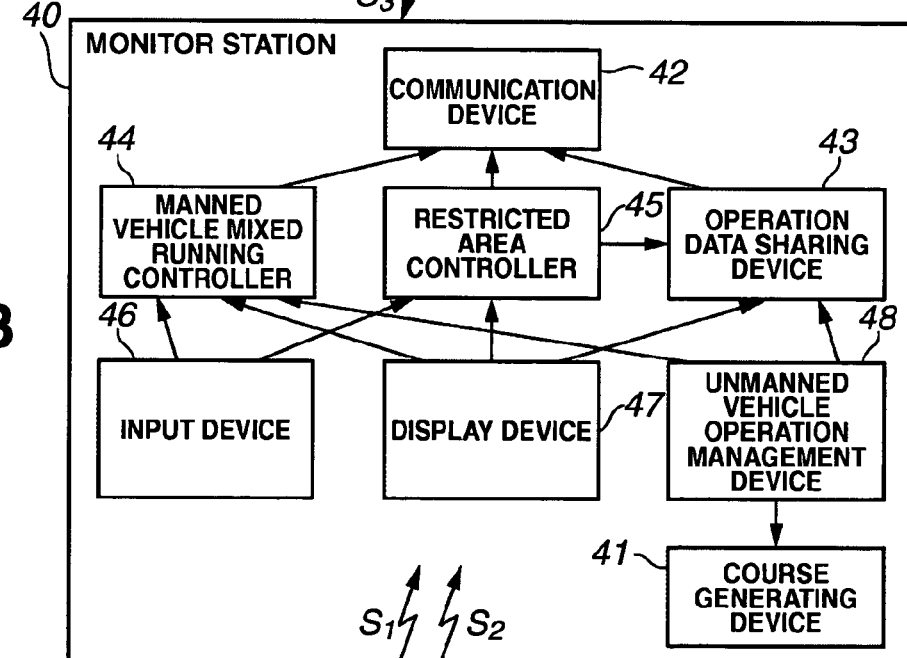
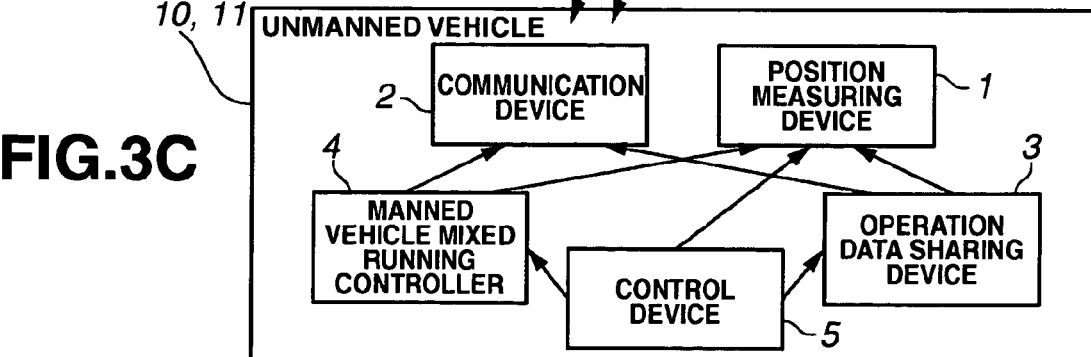

TRAVEL CONTROL DEVICE AND METHOD FOR VEHICLES

BACKGROUND OF THE INVENTION

1. Field of the Invention

The present invention relates to travel control device and method for vehicles for causing unmanned vehicles, which are equipped with travel control means for moving the vehicles along a directed traveling course according to the data of the traveling course, to proceed towards each other from the opposite directions on a traveling road having adjacent outward/return traffic lanes.

2. Description of the Related Art

When conveying the earth and sand deposited in a quarry, mine, or other large work area, in order to avoid accidents caused by fatigue of a worker, to achieve downsizing of manpower, and to improve the productivity by extending the work hours, there is introduced an unmanned vehicle travel system for activating unmanned vehicles instead of manned vehicles such as off-road dump trucks. The unmanned vehicle travel system is constructed such that, in order to manage the operation of plural unmanned dump trucks, monitor stations are set up as ground-based stations and the plural unmanned dump tracks are integrally managed and monitored by means of these monitor stations.

However, it is practically impossible to make all vehicles traveling in the work area unmanned. Specifically, besides the unmanned dump trucks, it is necessary to allow manned vehicles such as a grader, road sprinkler, wheel loader, excavator, trailer, courtesy car for operator, measurement vehicle, and other manned vehicle to travel in the work area.

In the work area, as shown in FIG. 1, which is a schematic diagram showing an example of a road in a mine, inbound/outbound traffic lanes Ra, Rb which are adjacent to each other are provided on a traveling road R which connects a loading area A to a dumping area B, and, on the basis of data of the traveling course whish is set previously for each lane Ra, Rb (course data) and data related to travel of the vehicle which is obtained using a position measuring system such as a GPS (travel data: vehicle position, speed and the like), each vehicle T1, T2 is autonomously guided to travel, whereby the vehicles T1, T2 proceed towards each other from the opposite directions on the inbound/outbound traffic lanes Ra, Rb respectively.

Supposing, for example, that a manned motor grader T3 carries out a road construction on one side of the inbound/outbound traffic lanes, e.g. the traffic lane Ra, the road construction is performed at low speed or in a state in which the motor grader T3 is stopped, and thus impedes high-speed running of the vehicle T1 traveling behind on the same traffic lane Ra, thereby causing a reduction in the conveyance efficiency and work efficiency.

If the vehicles T1, T2, which proceed towards each other from the opposite directions, are both manned vehicles, the on-board operators can directly communicate with each other so that the vehicle T1 can pass the grader T3 and travel along a detour course Ca through the lane Rb which is opposite in relation to the vehicle T1, whereby the high-speed traveling can be continued without causing interference between the vehicles.

Furthermore, even if the vehicle T1, which tries to pass the grader T3 through the detour course Ca, is a manned vehicle and the opposing vehicle T2 is unmanned, the operator of the manned vehicle T1 can travel the detour course Ca with awareness about movement of the vehicle T2 on the opposite side, thus the high-speed traveling can be continued without causing interference between the vehicles.

Moreover, the operator of the manned vehicle T1 carefully observes movement of the grader T3 that the manned vehicle T1 tries to pass, and obtains permission to pass the grader T3, from the grader T3 via a wireless machine or the like according to need. Therefore, the manned vehicle T1 can pass the grader T3 without causing interference with the grader T3, while preventing a surprising behavior of the grader T3 (when, for example, the grader T3 strays onto the opposite lane Rb to make a turn).

However, in the case in which the vehicle T1, which tries to pass the grader T3 through the detour course Ca, is an unmanned vehicle (in the case in which the vehicle T2 on the opposite side is an unmanned or manned vehicle), the unmanned vehicle T1 itself does not have the ability to travel the opposite side along the detour course Ca while carefully observing movement of the vehicle T2 on the opposite side, or the ability to obtain permission to pass from the operator. Therefore, it is impossible for the vehicles to continue high-speed traveling without causing interference between the vehicles, unless some sort of control is added thereto. Further, the unmanned vehicle T1 itself does not have the ability to pass the grader T3 along the detour course Ca while carefully observing movement of the grader T3 that the unmanned vehicle T1 tries to pass. Therefore, interference with the grader T3 may be caused because of a surprising behavior of the grader T3 (when, for example, the grader T3 strays onto the opposite lane Rb to make a turn) while passing the grader T3, unless some sort of control is added to the vehicle T1.

Japanese Patent Application Publication No. 2000-339029 describes the invention which is designed to prevent the occurrence of interference between vehicles, wherein a circle, whose radius is the distance in which a vehicle moves from a current position thereof at the maximum speed, is obtained for each vehicle as an existable area, on the basis of the current position of each vehicle and the maximum speed of each vehicle, and, when interference is caused between the existable areas, it is determined that the corresponding vehicles could interfere with each other, whereby one of the vehicles is decelerated or stopped.

Also, Japanese Patent Application Publication No. H9-231500 describes the invention which is designed to prevent the occurrence of interference between an unmanned vehicle and manned vehicle that approach each other when traveling in the same direction, in the case in which the both vehicles fleet in the same direction, wherein when the distance between the manned vehicle and the unmanned vehicle behind narrows to a predetermined distance or less, the unmanned vehicle behind is decelerated or stopped.

Also, Japanese Patent Application Publication No. H11-242520 describes the invention which is designed to prevent the occurrence of interference between a vehicle and an obstacle on a traveling road, wherein a video camera or other obstacle sensor is installed in the vehicle, and when an obstacle is detected on the traveling road by the obstacle sensor, a detour course is created on the basis of information detected by the obstacle sensor, so that the vehicle is allowed to travel along the detour course to skirt the obstacle.

According to the invention described in Japanese Patent Application Publication No. 2000-339029, since one of the vehicles is decelerated or stopped when the vehicles come close to each other, the occurrence of interference between the vehicles can be prevented securely.

However, when the above invention is applied to a circumstance where the vehicle T1 is caused to travel along the detour course Ca and pass the grader T3 as shown in FIG. 1, the vehicle T1 comes close to the grader T3 as the vehicle T1 passes the grader T3, and thus the T1 is decelerated or stopped. Consequently, passing the grader T3 cannot be achieved. Moreover, in the above invention, coordination between the vehicles that proceed towards each other from the opposite directions is not taken in consideration at all. For this reason, there may be generated a situation in which the vehicle T1, which is in the middle of traveling the opposite lane Rb along the detour course Ca, comes close to the vehicle T2 traveling the same lane Rb in the opposite direction. In this case, the vehicle T1 is decelerated or stopped because the vehicle T1 comes close to the vehicle T2, thus even if the occurrence of interference between the both vehicles proceeding towards each other from the opposite directions can be prevented, passing the grader T3 cannot be achieved.

The invention described in Japanese Patent Application Publication No. H9-231500 is based on only the case in which plural vehicles fleet in the same travel direction, and does not assume the case in which plural vehicles proceed towards each other from the opposite directions. Therefore, when the above invention is applied to a circumstance where the vehicle T1 is caused to travel along the detour course Ca and pass the grader T3 as shown in FIG. 1, the vehicle T1 is decelerated or stopped at the point of time when the vehicle T1 comes close to the grader T3 to a predetermined distance in order to pass the grader T3, thus passing the grader T3 cannot be achieved.

The invention described in Japanese Patent Application Publication No. H11-242520 is based on only the case of avoiding an obstacle placed on a traveling road, and the vehicles proceeding towards each other from the opposite directions are not taken into consideration at all. For this reason, as shown in FIG. 1, even if the vehicle T1 can be caused to travel along the detour course Ca and pass the grader T3, the vehicle T1 may interfere with the vehicle T2 which travels on the opposite side. Moreover, in the invention described in Japanese Patent Application Publication No. H11-242520, the detour course Ca is created based on the information detected by the obstacle sensor, and a future behavior of the grader T3 which is the obstacle is not taken into consideration at all. Therefore, because of a surprising behavior of the grader T3, the vehicle T1 may interfere with the grader T3 while passing the grader T3 (when, for example the grader T3 strays onto the opposite lane Rb to make a turn). Also, the present invention cannot cope with a circumstance where there is a place which is slippery because of rain or where there is an object which should be avoided but could not be detected by the obstacle sensor.

Furthermore, the traveling road R such as a mine is an unpaved road, and a road surface thereof has windrow formed by a road maintenance work performed by the grader T3, or other obstacles that obstruct travel of the vehicle T1. Therefore, in some cases, there occurs a problem in which the vehicle T1 runs on to the windrow when passing the grader T3.

As described above, in any of the conventional technologies described above, although the occurrence of interference between vehicles can be prevented, passing a vehicle at high speed cannot be achieved, or although passing a vehicle at high speed can be achieved, the occurrence of interference between vehicles cannot be prevented, thus the conventional technologies could not satisfy such cases.

SUMMARY OF THE INVENTION

The present invention is contrived in view of such circumstances, and an object thereof is to securely ensure the safety and improve the conveyance efficiency and work efficiency by, when vehicles proceed towards each other from the opposite directions, a vehicle traveling behind is caused to bypass the front car (work vehicle, slowly-moving vehicle, disabled vehicle, or the like) at high speed because the front car is an obstacle to high-speed travel of the vehicle behind, while preventing the occurrence of interference between the both vehicles.

According to a first aspect of the present invention, there is provided a travel control device for vehicles, which causes unmanned vehicles, which are provided with travel control means for causing the vehicle to travel along an instructed traveling course in accordance with data on the instructed traveling course, to travel toward each other from opposite directions on a traveling road having adjacent outward/return lanes, the travel control device comprising restricted area creating means for creating a restricted area that surrounds one of the vehicles on either one of the outward/return lanes, on the basis of positional information of the vehicle; detour course creating means for creating, on the basis of the restricted area, a detour course which avoids the restricted area, passes the opposite lane, and returns to the original lane of the vehicle; detour course instruction means for providing each of the vehicles with information on the detour course; and travel permission command outputting means for providing a travel permission command for permitting the unmanned vehicle, which travels the lane on the restricted area side while blocking the vehicle on the lane which is the opposite side of the restricted area, to travel the detour course, on the basis of the positional information of the vehicles traveling toward each other from the opposite directions with the restricted area therebetween, wherein the travel control means of the unmanned vehicle provided with the travel permission command performs control so as to cause the vehicle to travel along the detour course in accordance with the data of the instructed detour course.

According to a second aspect of the present invention, the travel control device for vehicles comprises inputting means for inputting the positional information of a vehicle present in the restricted area, wherein the restricted area creating means creates the restricted area on the basis of the inputted positional information of the vehicle.

According to a third aspect of the present invention, the detour course creating means, detour course instruction means, and travel permission command outputting means are provided in a monitor station for monitoring travel of the vehicles; the monitor station and each of the vehicles are provided with transmitting/receiving means for mutually transmitting and receiving information between the monitor station and the vehicles; the information on the detour course is transmitted from the monitor station to each of the vehicles; and the travel permission command is transmitted from the monitor station to the unmanned vehicle traveling the lane on the restricted area side.

According to a fourth aspect of the present invention, the inputting means is provided in a manned or unmanned vehicle present in the restricted area; the detour course creating means, detour course instruction means, and travel permission command outputting means are provided in a monitor station for monitoring travel of vehicles; the monitor station and each of the vehicles are provided with transmitting/receiving means for mutually transmitting and receiving information between the monitor station and the vehicle; information on the restricted area is transmitted to the monitor station from the manned or unmanned vehicle present in the restricted area; the information on the detour course is transmitted from the monitor station to each of the vehicles; and the travel permission command is transmitted from the monitor station to an unmanned vehicle traveling the lane on the restricted area side.

According to a fifth aspect of the present invention, the restricted area is an area in which a vehicle performs a work, an area in which a vehicle travels at low speed, or an area in which a disabled vehicle exists.

According to a sixth aspect of the present invention, the vehicle present in the restricted area is a manned vehicle, and, under the condition that an authorization command for authorizing traveling the detour course is received from the manned vehicle, the travel permission command is provided to an unmanned vehicle traveling the lane on the restricted area side.

According to a seventh aspect of the present invention, there is provided a travel control method for a vehicle, which causes unmanned vehicles, which are provided with travel control means for causing the vehicle to travel along an instructed traveling course in accordance with data on the instructed traveling course, to travel toward each other from opposite directions on a traveling road having adjacent outward/return lanes, the travel control method comprising the steps of creating a restricted area that surrounds one of the vehicles on either one of the outward/return lanes, on the basis of positional information of the vehicle; creating, on the basis of the restricted area, a detour course which avoids the restricted area, passes the opposite lane, and returns to the original lane of the vehicle; and performing control so as to cause the vehicle to travel along an instructed detour course in accordance with data on the detour course, by informing each of the vehicles of the information on the detour course.

In the first aspect of the invention, as shown in FIG. 4, a restricted area 60 is created based on positional information 60A, 60B of a manned vehicle 20 traveling one side of inbound/outbound lanes 51, 52 (line 51), and a detour course 72 is created based on the information of the restricted area 60. Information on the detour course 72 is provided to each of unmanned vehicles 10, 11 and the manned vehicle 20. Then, on the basis of positional information of the unmanned vehicle 10 and unmanned vehicle 11 which proceed towards each other from the opposite directions with the restricted area 60 therebetween, the unmanned vehicle 11 on the lane 52 which is the opposite side of the restricted area 60 is blocked by a block position 61B and at the same time a travel permission command for permitting traveling the detour course 72 is issued to the unmanned vehicle 10 traveling the lane 51 on the restricted area 60 side so that the unmanned vehicle 10 travels the detour course 72. Therefore, according to the present invention, when the unmanned vehicle 10 and unmanned vehicle 11 are caused to proceed towards each other from the opposite directions, the occurrence of interference therebetween can be prevented securely, and at the same time the manned vehicle 20 or slowly-moving vehicle, which is an obstacle to high-speed travel of the vehicle 10 behind, can be bypassed at high speed, whereby the conveyance efficiency and work efficiency can be improved while securely ensuring the safety.

In the second aspect of the invention, as shown in FIGS. 4A, 4B, positional information on a starting point 60A and an end point 60B in a work scope of the manned vehicle 20 existing in the restricted area 60 is inputted from inputting means. Then, as shown in FIG. 4C, the restricted area 60 is created based on the inputted positional information on the starting point 60A and end point 60B in the work scope.

In the third aspect of the invention, as shown in FIG. 2, information on the detour course 72 is transmitted from a monitor station 40 to each of the vehicles 10, 11, 20 by means of wireless communications S1, S2, S3, and the travel permission command for permitting traveling the detour course 72 is transmitted from the monitor station 40 to the unmanned vehicle 10 traveling the lane 51 on the restricted area 60 side, by means of the wireless communication S1.

In the fourth aspect of the invention, as shown in FIG. 2, information on the restricted area 60 (the positional information on the starting point 60A and end point 60B in the work scope) is transmitted from the manned vehicle 20 existing in the restricted area 60 to the monitor station 40 by means of the wireless communication S3, the information on the detour course 72 is transmitted from the monitor station 40 to each of the vehicles 10, 11, 20 by means of the wireless communications S1, S2, S3, and the travel permission command for permitting traveling the detour course 72 is transmitted from the monitor station 40 to the unmanned vehicle 10 traveling the lane 51 on the restricted area 60 side, by means of the wireless communication S1.

In the fifth aspect of the invention, as shown in FIG. 4, FIG. 7 or 11, the restricted area 60 is created as an area for the manned vehicle 20 to carryout a work, an area for the unmanned vehicle 20 to travel at low speed, or an area for an unmanned vehicle 12 to travel at low speed. Moreover, the restricted area 60 can be created as an area in which a disabled vehicle can exist.

In the sixth aspect of the invention, as shown in FIG. 4, the vehicle existing in the restricted area 60 is the manned vehicle 20, and the travel permission command is issued to the unmanned vehicle 10 traveling the lane 51 on the restricted area 60 side, under the condition that an authorization command for authorizing traveling the detour course 72 is received from the manned vehicle 20. Accordingly, the authorization command is provided from the manned vehicle 20 at the point of time when there is no more probability of straying off the restricted area 60, thus the manned vehicle 20 is securely prevented from interfering with the unmanned vehicle 10.

BRIEF DESCRIPTION OF THE DRAWINGS

FIGS. 3A, 3B, 3C are configuration diagrams of a first embodiment;

DESCRIPTION OF THE EMBODIMENTS

Hereinafter, embodiments of the present invention is described in detail with reference to the accompanying drawings showing the embodiments.

Figure 1:
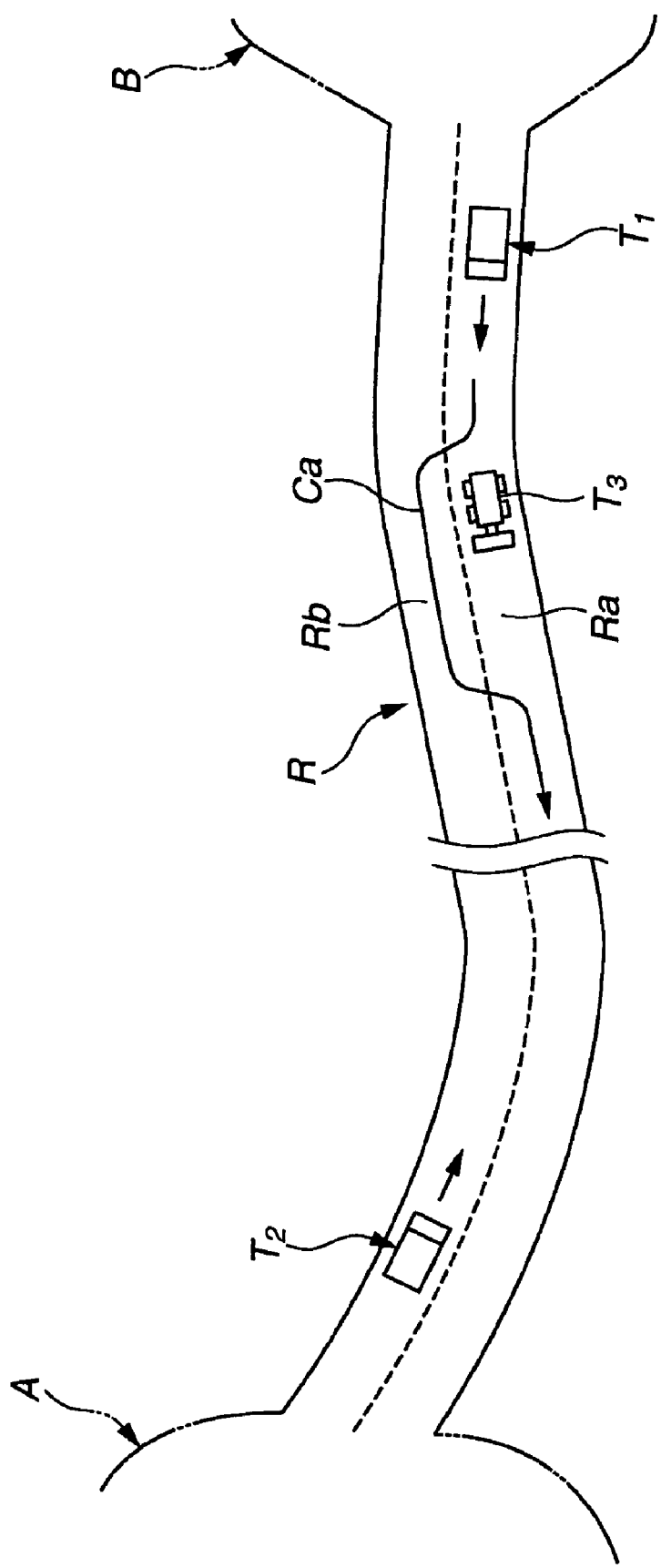
FIG. 1 is a figure for explaining the conventional technologies, and shows a state in which vehicles proceed towards each other from the opposite directions on a traveling road having inbound/outbound lanes.
Figure 2:
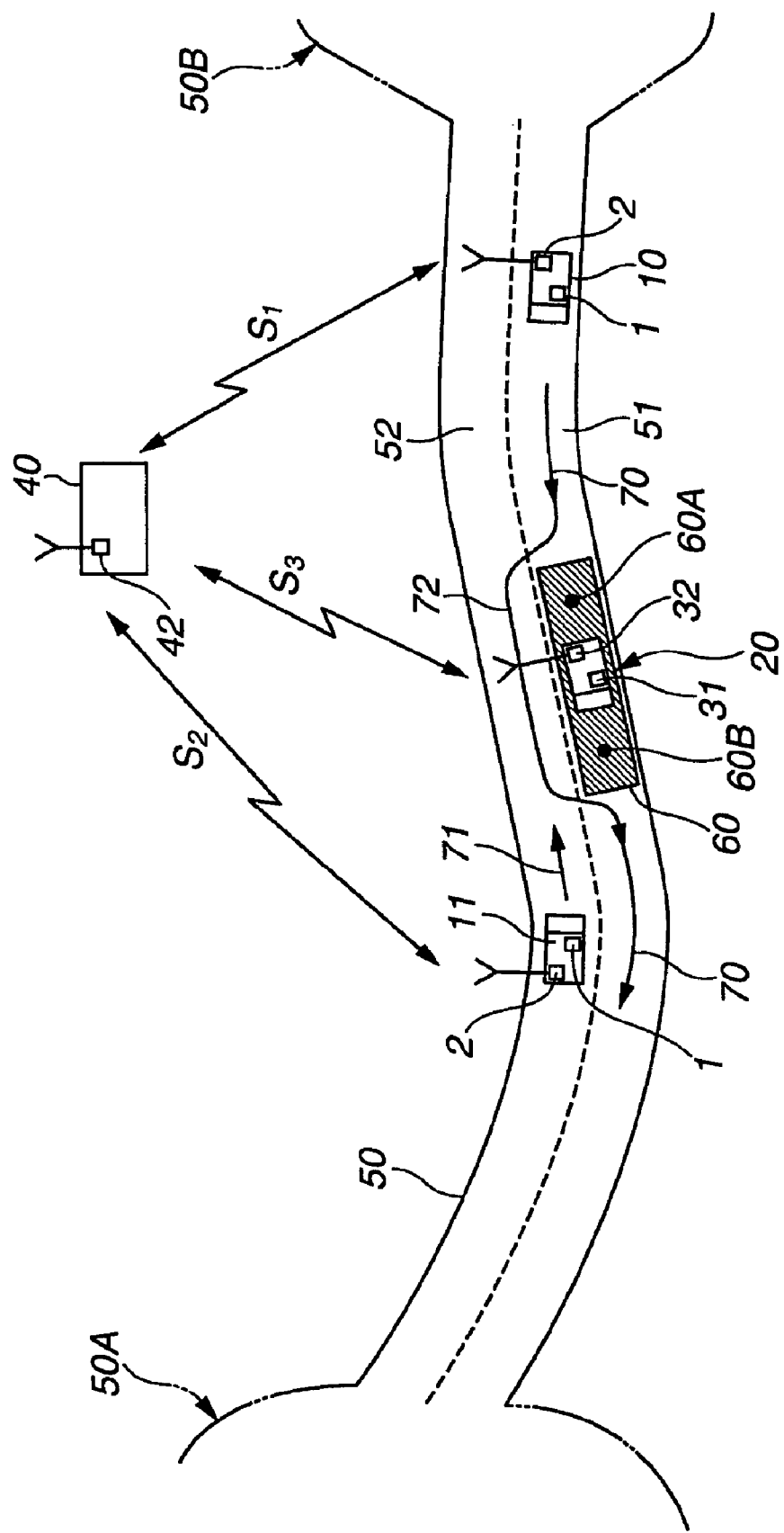
FIG. 2 is a figure for explaining embodiments, and shows a state in which vehicles proceed towards each other from the opposite directions on a road having inbound/outbound lanes.

FIG. 2 is a schematic diagram illustrating an example of a road in a mine, and shows an embodiment in which a travel control device for vehicles according to the present invention is adopted in an unmanned vehicle traveling system in a mine. In this embodiment, the unmanned vehicle traveling system is based on a dump truck as the unmanned vehicle.

As shown in FIG. 2, a traveling road 50, which connects a loading area 50A to a dumping area 50B, is provided with adjacent lanes 51, 52 on a two-way traffic road, and, on the basis of data items of traveling course 70, 71 which are previously set in the lanes 51, 52 respectively (course data) and data related to travel of a vehicle which is obtained using a position measuring system such as a GPS (travel data: vehicle position, speed and the like), each vehicle 10, 11 is autonomously guided to travel. FIG. 2 shows a state in which the unmanned vehicles 10, 11 proceed towards each other from the opposite directions along the traveling courses 70, 71 on the lanes 51, 52 on the two-way traffic road. It should be noted that "unmanned vehicle" means a vehicle which is activated without having an operator on-board.

Also, manned vehicles 20 exist on the traveling road 50. It should be noted that "manned vehicle" means a vehicle having an operator on-board. FIG. 2 shows a state in which a manned motor grader 20 carries out a road construction on one side of the lanes, lane 51, of the traveling road 50.

The road construction is carried out at in a work scope between a starting point 60A and an end point 60B by the slowly-moving or stopped manned vehicle 20. Moreover, the manned vehicle 20 sometimes travels backward between the starting point 60A and end point 60B. Therefore, the manned vehicle 20 is an obstacle to the vehicle (unmanned vehicle 10) traveling behind at high speed. Moreover, the traveling road 50, which is a mine, is an unpaved road, and a road surface thereof has windrow formed by a road maintenance work performed by the grader 20, or other obstacles that obstruct travel of the unmanned vehicles 10, 11. Therefore, as described hereinafter, an area, which is wider than the work scope connecting the starting point 60A and end point 60B and on which windrow may be formed, is set as a restricted area 60. Further, as described hereinafter, in order to prevent the occurrence of interference between the vehicles 10 and 11 proceeding towards each other from the opposite directions, the area wider than the restricted area 60 is set as a safety ensuring area 61. As described hereinafter, the detour course 72 deviating from a predetermined course 72 of the unmanned vehicle 10 traveling behind is created based on the restricted area 60 and the safety ensuring area 61 shown in FIG. 4C and FIG. 4D. The detour course 72 is a traveling course which is formed inside the safety ensuring area 61, and which the vehicle 10 takes to avoid the restricted area 60 while passing through the opposite lane 52, and then returns to the original lane 51.

The mine is provided with a monitor station 40 which manages and monitors the plural unmanned vehicles 10, 11 and manned vehicles 20 in the large work area.

A position measuring device 1 which measures the vehicle's own position, and a communication device 2 which communicates the data with the monitor station 40 by means of the wireless communication are installed in each of the unmanned vehicles 10, 11. Furthermore, a position measuring device 31 which measures the vehicle's own position, and a communication device 32 which communicates the data with the monitor station 40 by means of the wireless communication are installed in the manned vehicle 20. As the position measuring devices 1, 31 a position measuring system such as a GPS can be used.

A communication device 42 which communicates the data with the unmanned vehicles 10, 11 and unmanned vehicle 20 by means of the wireless communication is installed in the monitor station 40.

The data is communicated between the unmanned vehicle 10 and the monitor station 40 by means of the wireless communication S1. The data is also communicated between the unmanned vehicle 11 and the monitor station 40 by means of the wireless communication S2. Also, the data is communicated between the manned vehicle 12 and the monitor station 40 by means of the wireless communication S3.

FIGS. 3A, 3B, 3C are block diagrams showing a configuration of a device installed in the manned vehicle 20 (grader), monitor station 40, and unmanned vehicles 10, 11.

First of all, the configuration of the unmanned vehicles 10, 11 is described. It should be noted that the same device is installed in both unmanned vehicles 10, 11, but the configuration of the manned vehicle 10 is mainly described.

As shown in FIG. 3C, the abovementioned position measuring device 1, the abovementioned communication device 2, an operation data sharing device 3, manned vehicle mixed running controller 4, and control device 5 are installed in the manned vehicle 10.

The operation data sharing device 3 stores data required for operating the vehicle 10, such as data of the restricted area 60, safety ensuring area 61, detour course 72, and other data provided by the monitor station 40 via the communication device 2, and such operation data is shared by all of the vehicles 10, 11, 20 and the monitor station 40. On the basis of such operation data, the operation data sharing device 3 outputs, to the control device 5, the travel permission command for permitting the vehicle 10 to travel the detour course 72, and controls travel of the vehicle 10 so as to prevent the vehicle 10 from interfering with other unmanned vehicle 11 which travels from the opposite direction.

The manned vehicle mixed running controller 4 stores data required for causing the vehicle 10 to travel with the manned vehicle 20 on the traveling road 50, the data including data of the current positions of the manned vehicles 20, travel permission command for allowing travel the detour course 72, which is provided by the monitor station 40 via the communication device 2, and other data. On the basis of such data and the data of the current position of the vehicle 10, which is measured by the position measuring device 1, the manned vehicle mixed running controller 4 outputs, to the control device 5, the travel permission command for allowing the vehicle 10 to travel the detour course 72 and approach the restricted area 60 in which the manned vehicle 20 exists, and controls travel of the vehicle 10 so as to prevent the vehicle 10 from interfering with the unmanned vehicle 20.

The control device 5 travels while receiving course data from the operation data sharing device 3 and travel continuation permission from the manned vehicle mixed running controller 4. The operation data sharing device 3 receives a traveling course which is inputted into an operation data sharing device 43 by an unmanned vehicle operation management device 48 of the monitor station 40. For example, in the case of traveling the detour course, the unmanned vehicle operation management device 48 of the monitor station 40 inputs the detour course 72 and the traveling course 70 subsequent to the detour course 72 into the operation data sharing device 43 until reaching the point at which the traveling course 70 is switched to the detour course 72. The operation data sharing device 43 distributes the raveling courses for each of the manned vehicles 20 and unmanned vehicles 10, 11 via the communication device. The control device 5 travels in the order of course 70, course 72, and course 70 in accordance with the contents of this instruction.

Figure 4A:
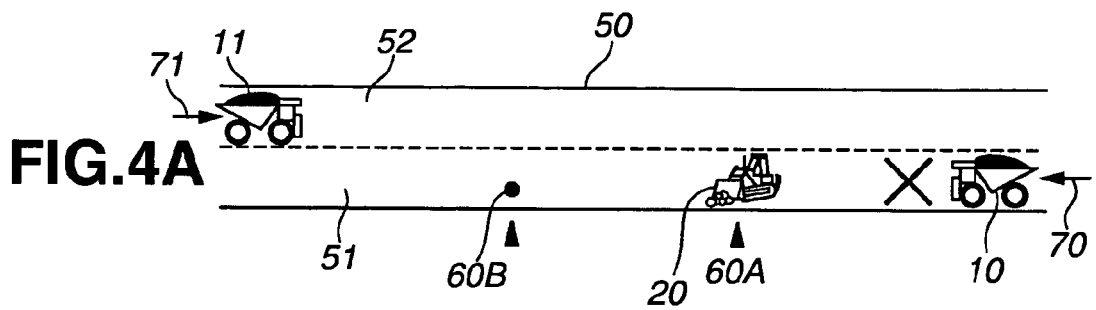
FIGS. 4A, 4B, 4C, 4D are figures for explaining processing of creating a detour course in the first embodiment.
Figure 4B:
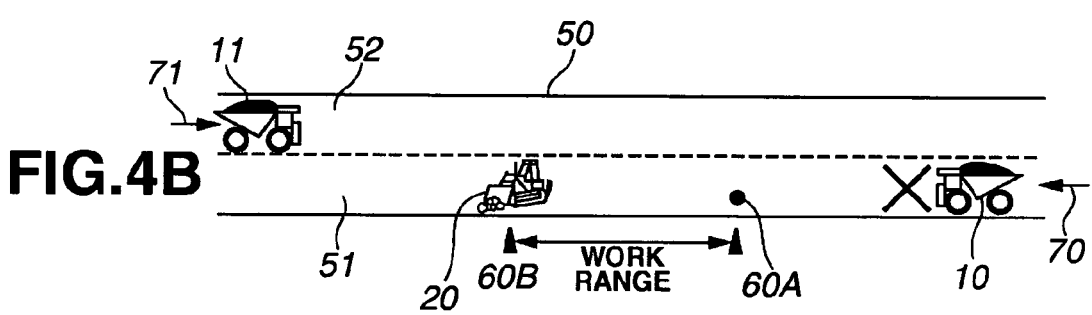
Figure 4C:
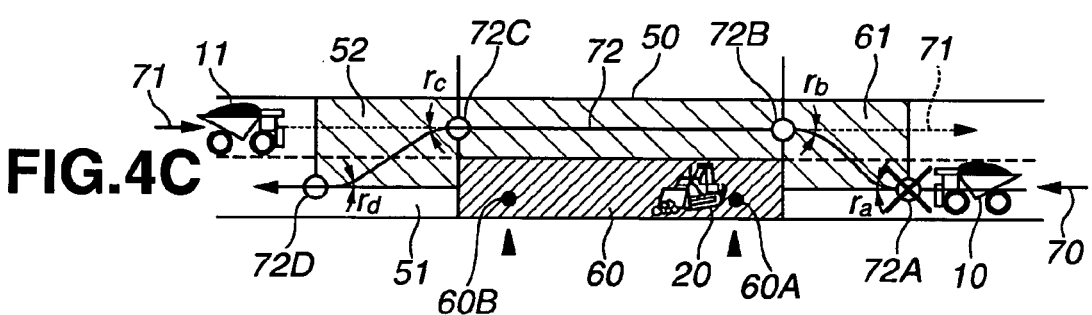
Figure 4D:
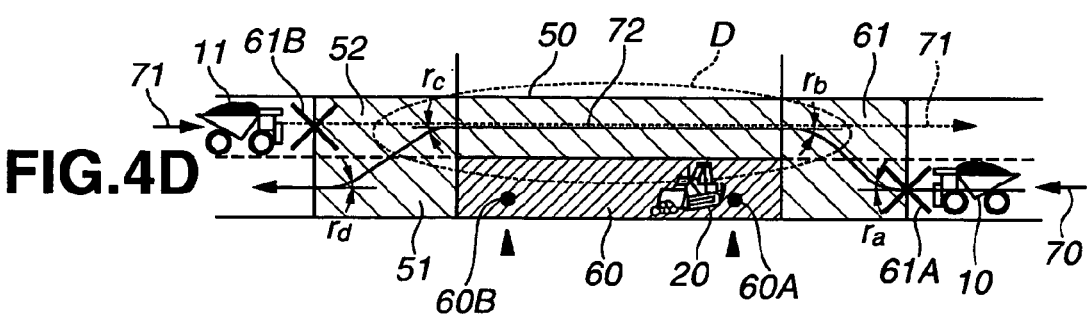

Further, as shown in FIG. 4D, when blocking the position of 61B, the unmanned vehicle operation management device 48 of the monitor station 40 inputs, into the operation data sharing device 43, a stop request for requesting the unmanned vehicle 11 to stop at the position of 61B. The unmanned vehicle 11 receives the stop request via the operation data sharing device 43 and transmits the stop request to the control device 5. When the control device 5 determines that stopping at the command position is not possible, the control device 5 passes through directly. In the meantime, the unmanned vehicle operation management device 48 of the monitor station 40 waits without issuing a travel instruction for instructing the unmanned vehicle 10 to travel the detour course 72. Moreover, when the control device 5 of the unmanned vehicle 11 determines that stopping is not possible, the control device 5 inputs data indicating that "plan of traveling the course 71 after 61B is cancelled" into the operation data sharing device 3. The unmanned vehicle operation management device 48 of the monitor station 40 receives the data via the operation data sharing device 43 and inputs the travel instruction for instructing the unmanned vehicle 10 to travel the detour course 72 into the operation data sharing device 43.

It should be noted that the course data of the planned traveling course 70 is obtained through a teaching work or the like which is carried out prior to actual traveling. The course data consists of data of the position of each point on the planned traveling course and of a specified travel direction. However, when the course data of the detour course 72 is given to the vehicle 10 via the monitor station 40 and the travel permission command of the detour course 72 is inputted to the control device 5, the control device 5 controls travel of the vehicle 10 so as to cause the vehicle 10 to deviate from the traveling course 70 to travel the detour course 72. Specifically, the control device 5 controls travel of the vehicle 10 by comparing the current position of the vehicle 10 measured by the position measuring device 1 with the position of the point on the traveling course 70 (or the detour course 72) to which the vehicle 10 should proceed, comparing a specified direction of travel in the same point with the current direction of travel, and adjusting the steering angle, brakes, transmission speed stages, engine speed, and the like so that the amount of deviation with respect to a target point and the amount of deviation of the travel direction from the specified direction in the target point are minimized.

Next, the configuration of the manned vehicles 20 is explained. It should be noted that the devices installed in each of the manned vehicles 20 are same as those installed in the vehicles 10, 11, thus one of the manned vehicles 20 is described herein.

As shown in FIG. 3A, the position measuring device 31, the communication device 32, an operation data sharing device 33, manned vehicle mixed running controller 34, restricted area controller 35, input device 36, and display device 37 are installed in the manned vehicle 20.

The operation data sharing device 33 stores data required for operating the vehicle 20, such as data of the restricted area 60 and detour course 72, and data of a travel permission command of the detour course 72 provided by the monitor station 40 to the unmanned vehicles 10, 11 via the communication device 32, and such operation data is shared by all of the vehicles 10, 11, 20 and the monitor station 40. On the basis of such operation data, the operation data sharing device 33 outputs, to the display device 37, a display command for permitting the restricted area 60, safety ensuring area 61, detour course 72, and the position of the vehicle which is permitted to travel, and prevents a manned vehicle or unmanned vehicle from interfering with other unmanned vehicle 10, 11.

The input device 36 is constituted by a keyboard and the like, and inputs positional data of the starting point 60A and end point 60B of a work range of the vehicle 20, further inputs data of a travel permission command for permitting the unmanned vehicles 10, 11 to travel the detour course 72, and, when the work is finished, inputs data for notifying that the work is finished.

The manned vehicle mixed running controller 34 inputs into and outputs from the communication device 32 the data of the travel permission command for permitting the vehicle 20 to travel the detour course 72, the data being inputted by the input device 36, or data of a command for obtaining travel permission from the monitor station 40, and prevents the vehicle 20 to interfere with the unmanned vehicles 10, 11.

The restricted area controller 35 outputs, to the communication device 32, the positional data of the starting point 60A and end point 60B of the work range of the vehicle 20 in order to create the restricted area 60 and safety ensuring area 61 by means of the monitor station 40, the positional data being inputted by the input device 36, and, when the notification of end of work is inputted by the input device 36, outputs the notification of end of work to the communication device 32 in order to delete the restricted area 60, safety ensuring area 61, and detour course 72 by means of the monitor station 40.

The display device 37 displays the restricted area 60, safety ensuring area 61, detour course 72, the position of the vehicle which is permitted to travel, and the current position of the vehicle 20 which is measured by the position measuring device 31, on a display screen, on the basis of an inputted display command.

Next, the configuration of the monitor station 40 is explained. A data input operation performed by the monitor station 40 is performed by an operator on the monitor station 40 side.

As shown in FIG. 3B, a course generating device 41, the communication device 42, operation data sharing 43, a manned vehicle mixed running controller 44, restricted area controller 45, input device 46, display device 47, and the unmanned vehicle operation management device 48 are installed in the monitor station 40.

The restricted area controller 45 creates the restricted area 60 and safety ensuring area 61 on the basis of the positional data of the starting point 60A and end point 60B of the work region of the manned vehicle 20, the positional data being inputted via the communication device 42, outputs such data to the operation data sharing device 43, and outputs, to the operation data sharing device 43, a restricted area deletion command for deleting the restricted area 60, safety ensuring area 61, and detour course 72, on the basis of a notification of end of work, which is inputted via the communication device 42.

The manned vehicle mixed running controller 44 stores data of a travel permission command which is inputted via the communication device 42, and other data required when the manned vehicle 20 travels the traveling road 50 with the manned vehicle 10, 11 and outputs the data of the travel permission command to the unmanned vehicle operation management device 48.

The operation data sharing device 43 outputs, to the communication device 32, the data of the restricted area 60, safety ensuring area 61, and detour course 72, the data of a travel permission command for permitting the unmanned vehicles 10, 11 to travel the detour course 72, the data of the restricted area deletion command for deleting the restricted area 60, safety ensuring area 61, and detour course 72, and other data required for operation of each vehicle, and provides these data items to all of the vehicles 10, 11, 20. Accordingly, the stored data in the operation data sharing device 43 of the monitor station 40 becomes the operation data shared by all of the vehicles 10, 11, 20 and the monitor station 40.

The unmanned vehicle operation management device 48 manages the operation of the unmanned vehicles 10, 11 and causes the course generating device 41 to create the detour course 72 on the basis of the restricted area 60 and the safety ensuring area 61. The created detour course 72 is stored in the operation data sharing device 43. Also, on the basis of the stored data in the operation data sharing device 43 and the travel authorization command obtained via the manned vehicle mixed running controller 34, the unmanned vehicle operation management device 48 generates a travel permission command for allowing the unmanned vehicle 10 to safely travel the detour course 72 without interfering with the unmanned vehicle 11 or manned vehicle 20, and outputs the travel permission command to the operation data sharing device 43. Further, on the basis of the restricted area deletion command stored in the operation data sharing device 43, the unmanned vehicle operation management device 48 deletes the data of the restricted area 60, safety ensuring area 61, and detour course 72 stored in the operation data sharing device 43, and outputs, to the operation data sharing device 43, a command for prohibiting the unmanned vehicles 10, 11 from entering the deleted detour course 72.

As with the input device 36 of the manned vehicle 20, there is provided the input device 46 in order to define the restricted area. However, since the monitor station 40 is not a direct operator, defining the restricted area includes the steps of inputting the positional data of the starting point 60A and end point 60B of a range, specifying a manned or unmanned disabled vehicle, setting the region in which the disabled vehicle exists as a restricted section, drawing a figure thereof to set it as the restricted area. Furthermore, when it is determined that it is safe even when the unmanned vehicles 10, 11 travel the defined restricted area, data of a notification of deletion of the restricted area is inputted into the input device 46. As with the manned vehicle 20, a configuration may be made in which if an authorization of passage is not obtained from the monitor station 40, the unmanned vehicles 10, 11 are prevented from passing through the detour course 72.

There is provided the display device 47 in order to display the restricted area 60, safety ensuring area 61, detour course 72, and the position of a vehicle which is allowed to travel, on the basis of a display command, and to monitor the operation of all of the vehicles.

First Embodiment

Detouring when a Manned Vehicle is Carrying Out a Work

Figure 5:
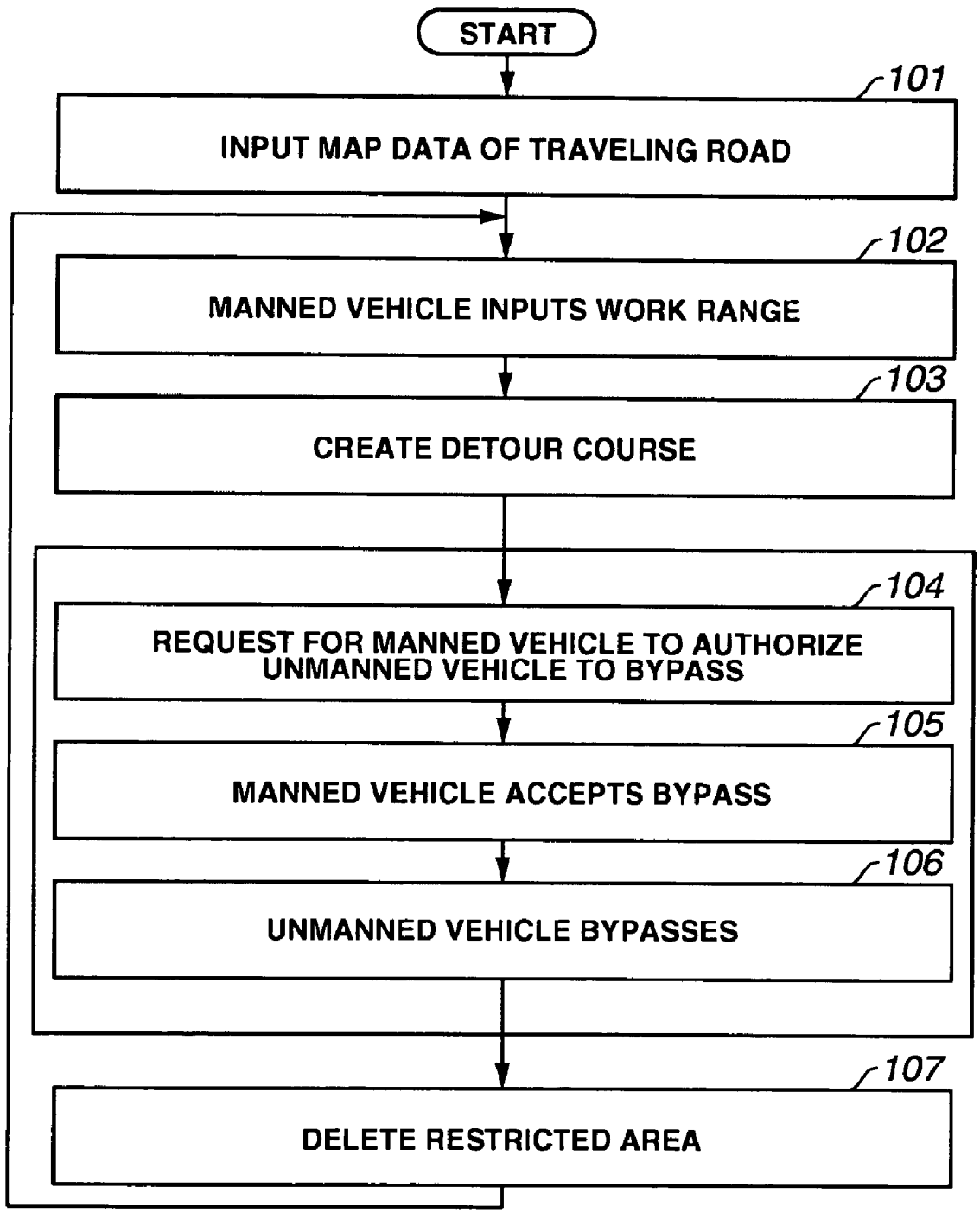
FIG. 5 is a flowchart showing the sequence of the processing of the first embodiment.

Hereinafter, a procedure of a process in the embodiment is described with reference to FIGS. 4A, 4B, 4C, 4D showing the traveling path 50, and the flowchart shown in FIG. 5.

This embodiment assumes the case in which the manned vehicle 20 carries out a road construction or the like on the traveling road 50.

First of all, before starting the work on a mine, map data of the traveling road 50 is inputted from the input device 46 of the monitor station 40 and stored in the operation data sharing device 43. This map data includes data showing the terrain of a position of a shoulder of the traveling road 50 or other terrain. The map data of the traveling road 50 is transmitted to all of the unmanned vehicles 10, 11 via the communication device 42 of the monitor station 40 by means of the wireless communications S1, S2 received by the communication device 2 of each of the unmanned vehicles 10, 11 and stored in the operation data sharing device 3. Moreover the map data is transmitted to all of the manned vehicles 20 via the communication device 42 of the monitor station 40 by means of the wireless communication S3 received by the communication device 32 of each of the manned vehicles 20 and stored in the operation data sharing device 33.

It should be noted that, before starting the mine work, the unmanned vehicles or manned vehicles perform a work for teaching the traveling courses 70, 71 that the unmanned vehicles 10, 11 plan to travel, and data of the planned traveling courses 70, 71 shared by the unmanned vehicles 10, 11 are stored in the unmanned vehicle operation management device 48 of the monitor station 40.

The control device 5 of each of the unmanned vehicles 10, 11 performs control so as to cause the vehicles 10, 11 to travel along the traveling courses 70, 71 according to the course data of the traveling courses 70, 71 (step 101).

On the display screen of the display device 37 of the manned vehicle 20, as shown in FIGS. 4A and 4B, there are displayed the traveling road 50 and the position of the vehicle 20 on the traveling road 50 on the basis of the map data stored in the operation data sharing device 33 and data of the current position measured by the position measuring device 31.

When an operator of the manned vehicle 20 attempts to perform a road construction work, as shown in FIGS. 4A and 4B, the operator uses the input device 36 to sequentially input data of the starting point 60A and end point 60B of a work range in the lane 51 on the traveling road 50 where the operator attempts to perform the road construction work (information on the restricted area 60 on the lane 51 of the vehicle 20), while viewing the display screen of the display device 37. In this case, the manned vehicle 20 is caused to actually travel, and when the vehicle 20 specifies and inputs the position of the starting point 60A and of the end point 60B as "starting point" and "end point" respectively every time when the manned vehicle 20 reaches the positions of the starting point 60A and of the end point 60B, the positions, which are measured by the position measuring device 31 at the time of the input, are stored in the restricted area controller 35. The restricted area controller 35 outputs the positional data of the starting point 60A and end point 60B of the work range of the vehicle 20, to the communication device 32. In response to this output, the communication device 32 transmits the positional data of the starting point 60A and end point 60B to the communication device 42 of the monitor station 40 by means of the wireless communication S3 (step 102).

The communication device 42 of the monitor station 40 receives the positional data of the starting point 60A and end point 60B of the work range of the manned vehicle 20, and the positional data is transmitted to the restricted area controller 45. In the restricted area controller 45, as shown in FIG. 4C, on the basis of the positional data of the starting point 60A and end point 60B of the work range of the manned vehicle 20, a region, which is wider than the work range connecting the starting point 60A and the end point 60B and in which an obstacle such as windrow is formed, is created as the restricted area 60 with a margin on the lane 51 side where the manned vehicle 20 exists. Moreover, a region wider than the restricted area 60 is created as the safety ensuring area 61 across the lanes 51 and 52. The restricted area 60 is a region to which all of the unmanned vehicles 10, 11 are prohibited from accessing. The safety ensuring area 61 is a region surrounding the restricted area 60 and allowing an unmanned vehicle with travel permission to travel therein.

Data of the created restricted area 60 and safety ensuring area 61 is transmitted to the operation data sharing device 43.

The unmanned vehicle operation management device 48 causes the course generating device 41 to create the detour course 72 on the basis of the data of the restricted area 60 and safety ensuring area 61 stored in the operation data sharing device 43.

The detour course 72 is a traveling course on the lane 51 on the restricted area 60 side, which is deviated from a planned traveling course 70 of an unmanned vehicle (unmanned vehicle 10) traveling behind the manned vehicle 20. This detour course 72 deviates from the traveling course 70 at an entrance point 72A of the safety ensuring area 61, passes through a point 72B of the opposite lane 52 (point corresponding to the entrance of the restricted area 60) and a point 72C on the opposite lane 52 (point corresponding to the exit of the restricted area 60) so as to avoid the restricted area 60, returns to the lane 51 on the restricted area 60 side, and then returns to the traveling course 70 of the vehicle 10 at an exit point 72D of the safety ensuring area 61. The detour course 72 is created within the safety ensuring area 61. Furthermore, data of block positions 61A, 61B is created. As shown in FIG. 4D, when travel permission is not obtained, the unmanned vehicles 10, 11 are caused to wait at the block position 61A corresponding to the entrance point 72A of the safety ensuring area 61 (lane 51 side) and the block position 61B corresponding to the exit point 72D of the safety ensuring area 61 (lane 52 side), respectively, in order to ensure safety.

In consideration of vehicle data such as the inside wheel difference and outside wheel difference of the unmanned vehicle 10 traveling the detour course 72, map data on the traveling road 50 (positions of shoulders on the traveling road 50, or the like), positional data on the restricted area 60 and the safety ensuring area 61, the course 72 is set so that the unmanned vehicle 10 is prevented from deviating from a shoulder of the traveling road 50 or interfering with the manned vehicle 20 present in the restricted area 60. It should be noted that, as shown in the example in FIG. 4C, while proceeding from the entrance point 72A of the safety ensuring area 61 to the point 72B of the opposite lane 52 corresponding to the entrance of the restricted area 60, lanes are changed from the traveling lane 51 to the opposite lane 52, and while proceeding from the point 72C on the opposite lane 52 corresponding to the exit of the restricted area 60 to the exit point 72D of the safety ensuring area 61, lanes are changed from the opposite lane 52 to the original traveling lane 51, whereby the detour course 72 is created. In the case of a front wheel steering unmanned vehicle 10 in which the front wheels are steered, it is desired that the detour course 72 be created such that the unmanned vehicle 10 separates from the traveling lane 51 at small radius of curvature ra to move to the opposite lane 52 at large radius of curvature rb, and again separates from the opposite lane 52 at small radius of curvature rc to return to the traveling lane 51 at large radius of curvature rd.

The unmanned vehicle operation management device 48 of the monitor station 40 transmits the data of the detour course 72 created as above and the data of the block positions 61A, 61B to the operation data sharing device 43.

Accordingly, in the operation data sharing device 43, the data of the restricted area 60, safety ensuring area 61, detour course 72, and block positions 61A, 61B are stored. The operation data sharing device 43 then outputs these data items of the detour course 72 and the like to the communication device 42. In response to this output, the communication device 42 transmits these data items of the detour course 72 and the like to the communication device 2 of each of the unmanned vehicles 10, 11 by means of the wireless communications S1, S2 and to the communication device 32 of the manned vehicle 20 by means of the wireless communication S3. Accordingly, the data items of the detour course 72 and the like are stored in the operation data sharing device 3 of each unmanned vehicle 10, 11 and in the operation data sharing device 33 of the manned vehicle 20, and the shared data items of the detour course 72 and the like are provided to all of the vehicles 10, 11, 20 (step 103).

As shown in FIG. 4D, on the display screen of the display device 37 of the manned vehicle 20, there are displayed the restricted area 60, safety ensuring area 61, detour course 72, and the current position of the vehicle 20 measured by the position measuring device. Accordingly, the operator of the manned vehicle 20 can recognize that there is a possibility that the unmanned vehicle 10 passes through the detour course 72 to pass through the proximity of the area 60 where the vehicle 20 carries out a work.

The current positions of the vehicles 20 which are measured by the position measuring device 31 of each manned vehicle 20 are sequentially transmitted to the monitor station 40 via the communication device 32 by means of the wireless communication S3, received by the communication device 42 of the monitor station 40, and then transmitted to the manned vehicle mixed running controller 44 of the station 40. The manned vehicle mixed running controller 44 of the monitor station 40 outputs the current position of each manned vehicle 20 to the communication device 42 of the station 40. Accordingly, the current position of each manned vehicle 20 is transmitted to each of the unmanned vehicles 10, 11 by the communication device 42 of the monitor station 40 by means of the wireless communications S1, S2 received by the communication device 2 of each unmanned vehicle 10, 11 and then transmitted to the manned vehicle mixed running controller 4 of the vehicles 10, 11.

Also, the current positions of the unmanned vehicles 10, 11 measured by the position measuring device 1 of each of the vehicles 10, 11 are sequentially transmitted to the monitor station 40 from the communication device 2 by means of the wireless communications S1, S2 received by the communication device 42 of the monitor station 40, and then transmitted to the unmanned vehicle operation management device 48 of the station 40.

The unmanned vehicle operation management device 48 of the monitor station 40 compares the position of the unmanned vehicle 10 traveling the lane 51 on the restricted area 60 side with the block position 61A to predict and determine whether there is a possibility that the unmanned vehicle 10 traveling the lane 51 on the restricted area 60 side passes through the restricted area 60.

As a result, if it is predicted that there is a possibility that the unmanned vehicle 10 passes through the restricted area 60, a command for requesting for authorization for this unmanned vehicle 10 to travel the detour course 72 is transmitted to the manned vehicle mixed running controller 44 of the station 40 of the unmanned vehicle 10. In response, the manned vehicle mixed running controller 44 outputs the command for requesting for travel authorization, to the communication device 42 of the station 40. Accordingly, the command for requesting for travel authorization is transmitted to the communication device 32 of the manned vehicle 20 by means of the wireless communication S3, the manned vehicle 20 inputting the information on the restricted area 60, i.e., the data of the starting point 60A and end point 60B (step 104).

The command for requesting for travel authorization is received by the communication device 32 of the manned vehicle 20 and transmitted to the manned vehicle mixed running controller 34 of the vehicle 20. The manned vehicle mixed running controller 34 outputs the command for requesting for travel authorization as a display command to the display device 37. Accordingly, "travel authorization requested" is displayed on the display screen of the display device 37 of the manned vehicle 20.

The operator of the manned vehicle 20 views "travel authorization requested" displayed on the display screen of the display device 37, and, as shown, for example, in FIG. 4D, accepts the request for travel authorization if there is no problem in which the vehicle 20 may stray off the restricted area 60 in order to make a turn or the like and interfere with the unmanned vehicle 10 at a region D, and then inputs the command of travel authorization by means of the input device 36. Moreover, even when there is no request for travel authorization from the monitor station 40 and such a request for travel authorization is not displayed on the display screen of the display device 37, the operator of the manned vehicle 20 can accept the request for travel authorization if there is no problem in which the vehicle 20 may stray off the restricted area 60 and interfere with the unmanned vehicle 10, and voluntarily input the command for travel authorization by means of the input device 36.

The command for travel authorization which is inputted by the input device 36 is transmitted to the manned vehicle mixed running controller 34 of the vehicle 20. The manned vehicle mixed running controller 34 outputs the travel authorization command to the communication device 32 of the vehicle 20. In response, the travel authorization command is transmitted from the communication device 32 of the manned vehicle 20 to the monitor station 40 by means of the wireless communication S3 (step 105).

The travel authorization command is then received by the communication device 42 of the monitor station 40, transmitted to the manned vehicle mixed running controller 44 of the station 40, and then outputted to the unmanned vehicle operation management device 48.

The unmanned vehicle operation management device 48 determines whether to provide each unmanned vehicle 10 with a travel permission command for permitting the vehicle 10 traveling the lane 51 on the side of the restricted area 60 to travel the detour course 72, on the basis of the travel authorization command and the positional information on the unmanned vehicles 10, 11 traveling toward each other from the opposite directions with the restricted area 60 therebetween.

Specifically, the reason is that, even if the travel authorization command is obtained from the manned vehicle 20, the unmanned vehicle 10 should not be allowed to enter the detour course 72 if the unmanned vehicle 11 traveling the lane 52 opposite from the unmanned vehicle 10 approaches the restricted area 60.

The unmanned vehicle operation management device 48 compares the block positions 61A, 61B with the current positions of the unmanned vehicles 10, 11 to sequentially determine whether the unmanned vehicles 10, 11 are in the middle of approaching the restricted area 60.

When the unmanned vehicles 10, 11 approach the restricted are 60 without obtaining the travel authorization from the manned vehicle 20, there is a possibility that the manned vehicle 20 strays off the restricted area 60 to carry out a work, thus a stop command is provided to the unmanned vehicle 10 traveling the lane 51 on the restricted area 60 side to cause the unmanned vehicle 10 to stop at the block position 61A, and a stop command is also provided to the unmanned vehicle 11 traveling the opposite lane 52 to cause the unmanned vehicle 11 to stop at the block position 61B on the opposite lane 52 in order to prevent the occurrence of interference.

When the travel authorization is obtained from the manned vehicle 20, a stop command is provided to cause the unmanned vehicle 11 traveling the opposite lane 52 to stop at the block position 61A, and a travel permission command is provided to permit the unmanned vehicle 10 on the lane 51 on the restricted area 60 side to travel the detour course 72.

However, when the travel authorization is obtained from the manned vehicle 20, in the case in which the unmanned vehicle 11 on the opposite lane 52 approaches the restricted area 60 before the unmanned vehicle 10 traveling the lane 51 on the restricted area 60 side approaches, the unmanned vehicle 11 on the opposite lane 52 which approaches the restricted area 60 is prioritized to permit the unmanned vehicle 11 to pass through the safety ensuring area 61 side, and the stop command is provided to the unmanned vehicle 10 traveling the lane 51 on the restricted area 60 side to cause the unmanned vehicle 10 to stop at the block position 61A. Also, the system may be configured such that when the unmanned vehicle 11 on the opposite lane 52 passes through the proximity of the restricted area 60, a request for passage permission may be made to the manned vehicle 20. Then, at the point of time at which the unmanned vehicle 11 traveling the opposite lane 52 passes a side of the safety ensuring area 61, the travel permission command is provided to the unmanned vehicle 10 on the lane 51 on the restricted area 60 side to permit the unmanned vehicle 10 to travel the detour course 72.

The unmanned vehicle operation management device 48 transmits the generated travel permission command (or stop command) to the operation data sharing device 43. The operation data sharing device 43 outputs the travel permission command (or stop command) to the communication device 42 of the station 40. Accordingly, the travel permission command (or stop command) is transmitted from the communication device 42 of the monitor station 40 to the unmanned vehicle 10 by means of the wireless communication S1. It should be noted that, similarly, the travel permission command or stop command is provided to the unmanned vehicle 11 on the opposite lane 52.

The communication device 2 of the unmanned vehicle 10 receives the travel permission command (or stop command). The communication device 2 transmits the travel permission command (or stop command) to the operation data sharing device 3 of the vehicle 10.

On the other hand, on the basis of the positional data of each of the manned vehicles 20 the manned vehicle mixed running controller 4 of the unmanned vehicle 10 generates the travel permission command for permitting the vehicle 10 to travel the detour course 72, separately from the travel permission command provided from the monitor station 40. Specifically, the reason is that, even when the travel permission command is obtained from the monitor station 40, the manned vehicle 10 should not permitted to travel when there is a possibility that the manned vehicles 20 approach the unmanned vehicle 10 and interfere with the unmanned vehicle 10 because of a careless movement of each of the manned vehicles 20.

It should be noted that the manned vehicle mixed running controller 4 may generate the travel permission command as described above, or may perform the same operation of the following procedures 1) to 6). The reason is to avoid that the computation amount obtained in the controller of the unmanned vehicle increases until the arithmetic processing capability has no room, when the number of manned vehicles increases.

1) The manned vehicle mixed running controller 34 of each manned vehicle computes the possibility of interference between a course and the vehicle.
2) The manned vehicle mixed running controller 34 of the manned vehicle transmits travel continuation permission (travel permission for short range control) with a speed limit and time limit for a proximate unmanned vehicle to the monitor station 40.
3) The manned vehicle mixed running controller 44 of the monitor station 40 transmits travel permission with a time limit (travel permission for long range control) for a manned vehicle and unmanned vehicle which are positioned sufficiently far from each other.
4) The manned vehicle mixed running controller 44 of the monitor station 40 integrates the travel permission for short range control described in 2) and the travel permission for long range control described in 3), and transmits the integrated travel permission to the manned vehicle mixed running controller 4 of each of the unmanned vehicles 10, 11.
5) The manned vehicle mixed running controller 4 of each of the unmanned vehicles 10, 11 continues traveling in accordance with the travel permission for long range control and the travel permission for short range control.
6) When the next travel continuation permission is not issued even after the travel continuation permission is expired, the unmanned vehicle stops.

The control device 5 of the unmanned vehicle 10 asks the operation data shared device 3 of the unmanned vehicle 10 for a travel permission command, and asks the manned vehicle mixed running controller 4 of the vehicle 10 for a travel permission command. Under the conditions that the travel permission commands are outputted from both the operation data sharing device 3 and the manned vehicle mixed running controller 4, the control device 5 performs control so that the vehicle 10 travels the detour course 72.

However, when the travel permission command is not outputted from the operation data sharing device 3 or the manned vehicle mixed running controller 4, the control device 5 performs control so that the vehicle 10 stops when reaching the block position 61A in response to the stop command, or that, when the vehicle 10 is already in the middle of traveling the detour course 72, the vehicle 10 reduces the speed or stops in accordance with the circumstances. In this manner, the control device 5 asks for the travel permission command obtained from the monitor station 40 via the operation data sharing device 3 and also asks the manned vehicle mixed running controller 4 for travel continuation permission, and at the same time continues traveling the detour course 72 (step 106).

The processing from the steps 104 to 106 described above is repeatedly executed unless the command for deleting the restricted area 60 is outputted from the manned vehicle 20. This processing is performed similarly for other unmanned vehicles as well which travel from further back of the unmanned vehicle 10.

When the road construction performed by the manned vehicle 20 is finished, data of a notification of end of work is inputted from the input device 36. The notification of end of work is inputted to the restricted area controller 35 by the vehicle 20, and the restricted area controller 35 outputs the notification of end of work to the communication device 32 of the vehicle 20. In response, the notification of end of work is transmitted from the communication device 32 to the monitor station 40 by means of the wireless communication S3.

The communication device 42 of the monitor station 40 receives the notification of end of work, and this notification of end of work is transmitted to the restricted area controller 45 of the monitor station 40. The restricted area controller 45 transmits a restricted area deletion command to the operation data sharing device 43 of the station 40.

In response to that the restricted area deletion command is inputted to the operation data sharing device 43, the unmanned vehicle operation management device 48 outputs, to the operation data sharing device 43, a command for newly prohibiting a new unmanned vehicle to enter the detour course 72 after the restricted area deletion command is inputted, and deletes the data of the restricted area 60, safety ensuring area 61 and detour course 72 which are stored in the operation data sharing device 43. However, if the unmanned vehicle is in the middle of traveling the detour course 72 at the point of time at which the restricted area deletion command is inputted, the items of the restricted area 60 and the like are deleted after waiting for that the unmanned vehicle 10 passes through the detour course 72 (step 107).

It should be noted that in the above embodiment, the operator of the manned vehicle 20 inputs the data of the starting point 60A and end point 60B of the work range when the road construction is started, and the same operator inputs the data of notification of end of work from the input device 36 of the vehicle 20 when the work is finished. However, this operation may be performed at any place, or, for example, the operation of the monitor station 40 side may input the same data from the input device 46 while viewing the display screen of the display device 47 of the station 40.

Moreover, in the above embodiment, the monitor station 40 is used to transmit the data from the monitor station 40 to the unmanned vehicles 10, 11 or to transmit the data from the monitor station 40 the manned vehicles 20. However, a configuration is possible in which the data is transmitted directly from the unmanned vehicles 10, 11 to the manned vehicles 20 or directly from the manned vehicles 20 to the unmanned vehicles 10, 11 without passing through the monitor station 40. Specifically, the function of the monitor station 40 may be provided to the manned vehicle 20 so that the data is transmitted and received directly to and from the unmanned vehicles.

Second Embodiment

Detouring when a Manned Vehicle is Traveling at Low Speed

Hereinafter, a procedure of a process in the embodiment is described with reference the configuration diagrams of FIGS. 6A, 6B, 6C, FIGS. 7A, 7B, 7C, 7D showing the traveling path 50, and the flowcharts shown in FIGS. 8 and 9.

Figure 6A:
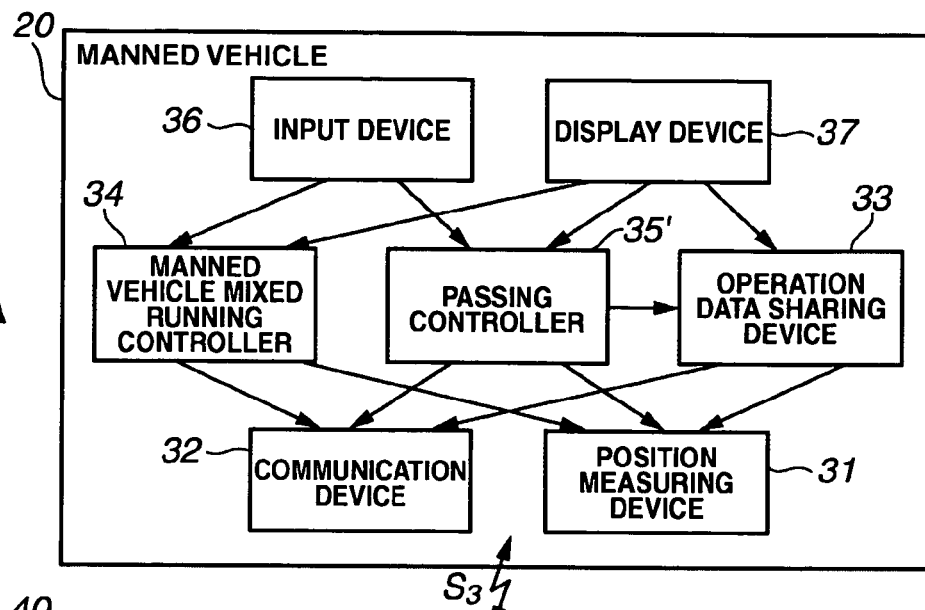
FIGS. 6A, 6B, 6C are configuration diagrams of a second embodiment.
Figure 6B:
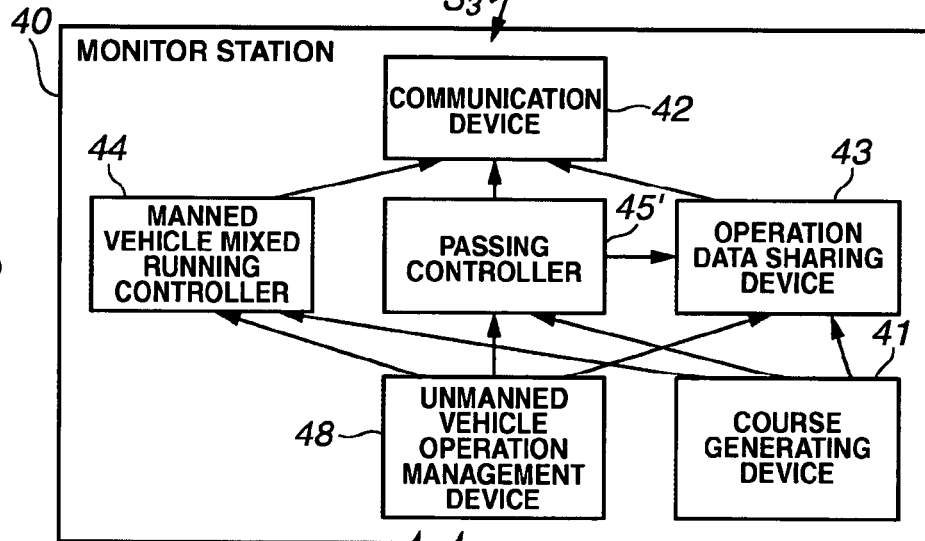
Figure 6C:
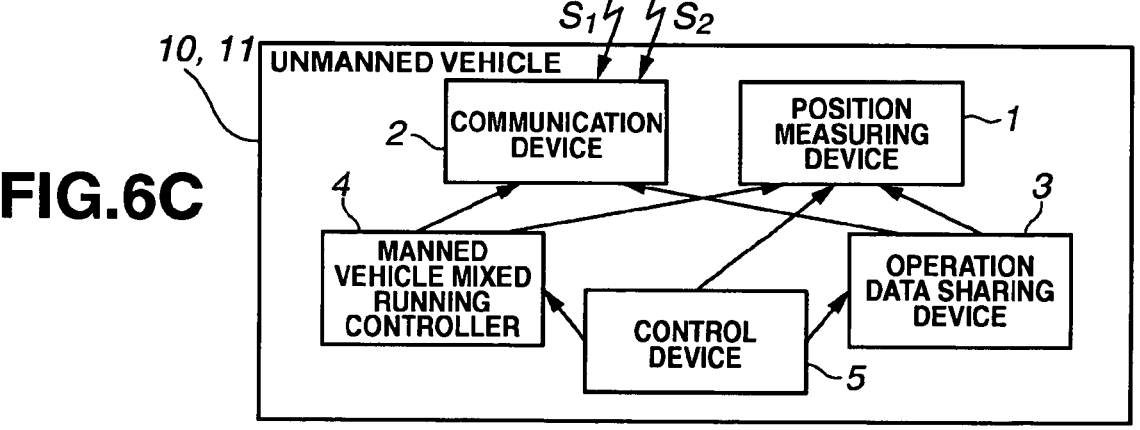

Each of FIGS. 6A, 6B, 6C corresponds to each of FIGS. 3A, 3B, 3C and the reference numerals in FIG. 6 indicate the same components, thus the explanations thereof are omitted accordingly.

However, as shown in FIG. 6A, the manned vehicle 20 is provided with a passing controller 35' instead of the restricted area controller 35.

Moreover, the monitor station 40 is not provided with the input device 46 or display device 47 shown in FIG. 3B, but is provided with the passing controller 45' instead of the restricted area controller 45.

The configurations of the unmanned vehicles 10, 11 are same as those shown in FIG. 3C.

This embodiment assumes a case in which the manned vehicle 20 travels at low speed on the traveling road 50. In this embodiment, as with the detour course 72 described in the first embodiment, a detour course 72 for the slow manned vehicle 20 to pass is created.

First of all, as with the step 101 in the first embodiment, before starting the work on a mine, map data of the traveling road 50 is stored in the operation data sharing device 43 beforehand. The map data of the traveling road 50 is transmitted to all of the unmanned vehicles 10, 11 via the communication device 42 of the monitor station 40 by means of the wireless communications S1, S2 received by the communication device 2 of each of the unmanned vehicles 10, 11 and stored in the operation data sharing device 3. Moreover, the map data is transmitted to all of the manned vehicles 20 via the communication device 42 of the monitor station 40 by means of the wireless communication S3 received by the communication device 32 of each of the manned vehicles 20 and stored in the operation data sharing device 33.

It should be noted that, before starting the mine work, the unmanned vehicles or manned vehicles perform a work for teaching the traveling courses 70, 71 that the unmanned vehicles 10, 11 plan to travel, and data of the planned traveling courses 70, 71 shared by the unmanned vehicles 10, 11 are stored in the unmanned vehicle operation management device 48 of the monitor station 40. The control device 5 of each of the unmanned vehicles 10, 11 performs control so as to cause the vehicles 10, 11 to travel along the traveling courses 70, 71 according to the course data of the traveling courses 70, 71 (step 201).

The current positions of the vehicles 20 which are measured by the position measuring device 31 of each manned vehicle 20 are sequentially transmitted to the monitor station 40 via the communication device 32 by means of the wireless communication S3, received by the communication device 42 of the monitor station 40, and then transmitted to the operation data sharing device 33 of the station 40. The operation data sharing device 33 of the monitor station 40 outputs the current position of each manned vehicle 20 to the communication device 42 of the station 40. Accordingly, the current position of each manned vehicle 20 is transmitted to each of the unmanned vehicles 10, 11 by the communication device 42 of the monitor station 40 by means of the wireless communications S1, S2 received by the communication device 2 of each unmanned vehicle 10, 11 and then transmitted to the manned vehicle mixed running controller 4 of the vehicles 10, 11.

Also, the current positions of the unmanned vehicles 10, 11 measured by the position measuring device 1 of each of the vehicles 10, 11 are sequentially transmitted to the monitor station 40 from the communication device 2 by means of the wireless communications S1, S2 received by the communication device 42 of the monitor station 40, and then transmitted to the operation data sharing device 43 of the station 40.

On the basis of the positional data of each unmanned vehicle 10, 11 and the positional data of each manned vehicle 20, which are stored in the operation data sharing device 43, the unmanned vehicle operation management device 48 of the monitor station 40 compares the position of the unmanned vehicle 10 traveling the lane 51 or change in the position of same per unit time (speed) with the position of the manned vehicle 20 traveling the same lane or change in the position of same per unit time (speed), and predicts and determine whether or not there is a possibility that the unmanned vehicle 10 catches up with the manned vehicle 20 traveling the same lane 51 at low speed.

As a result, when it is predicted that there is a possibility that the unmanned vehicle 10 catches up with the manned vehicle 20 traveling the same lane 51, a command for requesting the manned vehicle 20 to authorize the same unmanned vehicle 10 to travel and catch up with the manned vehicle 20 is transmitted to the passing controller 45' of the station 40. In response, the passing controller 45' outputs a command for requesting for travel authorization to the communication device 42 of the station 40. Accordingly, the command for requesting for travel authorization is transmitted through the wireless communication S3 to the communication device 32 of the manned vehicle 20 which may be passed by the unmanned vehicle 10 (step 202).

The command for requesting for travel authorization is received by the communication device 32 of the manned vehicle 20, and then transmitted to the passing controller 35' of the vehicle 20. The passing controller 35' outputs the command for requesting for travel authorization as a display command to the display device 37. Accordingly, "travel authorization (catch up authorization) requested" is displayed on the display screen of the display device 37 of the manned vehicle 20.

The operator of the manned vehicle 20 views "travel authorization requested" displayed on the display screen of the display device 37, and, if there is no such problems that the vehicle 20 may stray onto the opposite lane 52 in order to shift the vehicle 20 to high speed traveling or make a turn so that the vehicle 20 interferes with the unmanned vehicle 10 travelling toward the vehicle 20 from behind, accepts the request of travel authorization, and inputs a command of travel authorization by means of the input device 36. Moreover, even when there is no request for travel authorization from the monitor station 40 and such a request for travel authorization is not displayed on the display screen of the display device 37, the operator of the manned vehicle 20 can accept the request for travel authorization if there is no problem in which the vehicle 20 may be shifted to high speed traveling, and voluntarily input the command for travel authorization by means of the input device 36.

The command for travel authorization which is inputted by the input device 36 is transmitted to the passing controller 35' of the vehicle 20. The passing controller 35' outputs the travel authorization command to the communication device 32 of the vehicle 20. In response, the travel authorization command is transmitted from the communication device 32 of the manned vehicle 20 to the monitor station 40 by means of the wireless communication S3.

The travel authorization command is then received by the communication device 42 of the monitor station 40, transmitted to the passing controller 45' of the station 40, and then outputted to the unmanned vehicle operation management device 48.

The unmanned vehicle operation management device 48 determines whether or not the travel authorization command is inputted from the passing controller 45' (whether the manned vehicle 20 gives acceptance of passage (step 203).

As a result of this determination, the travel authorization command is inputted from the passing controller 45', and, in the case in which it is determined that the manned vehicle 20 gives acceptance of passage (YES in the determination in the step 203), a process of causing the unmanned vehicle 10 to stop at the safe block position 61B where the unmanned vehicle 10 can be prevented from interfering with the unmanned vehicle 11 when the unmanned vehicle 10 travels the detour course 72, on the basis of the positional information of the unmanned vehicle 11 traveling toward the unmanned vehicle 10 from the opposite direction with the slow manned vehicle 20 therebetween. Specifically, the reason is that, even when the travel authorization (passage authorization) command is obtained from the manned vehicle 20, the unmanned vehicle 10 should not be allowed to enter the detour course 72 when the unmanned vehicle 11 on the lane 52 opposite from the unmanned vehicle 10 approaches the manned vehicle 20 (step 204).

Figure 9:
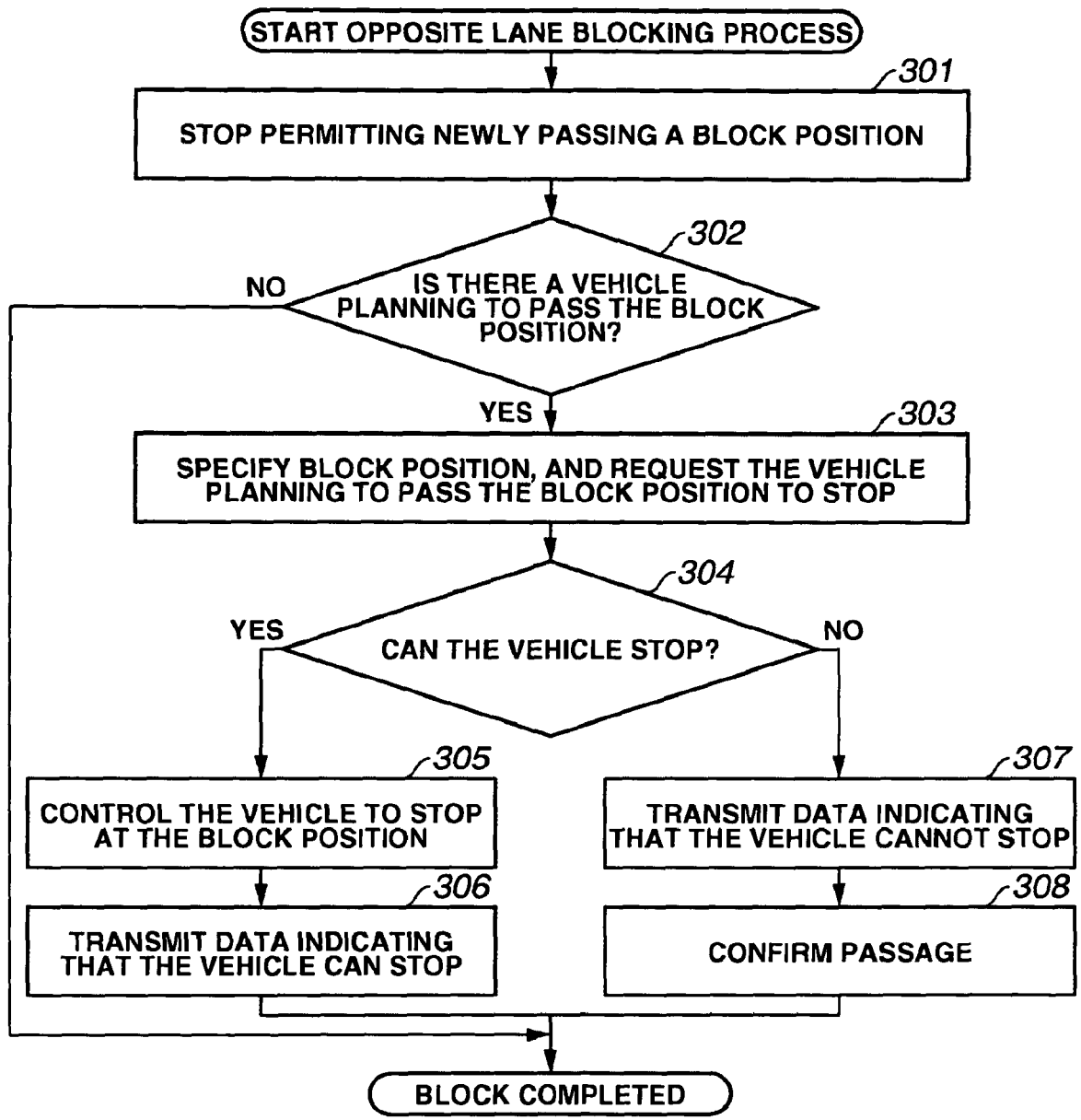
FIG. 9 is a flowchart showing the sequence of inbound/outbound lane block processing in the second embodiment.

FIG. 9 shows an opposite lane blocking process for causing the unmanned vehicle 11 traveling on the opposite lane 52 to stop at the block position 61B.

Figure 7A:
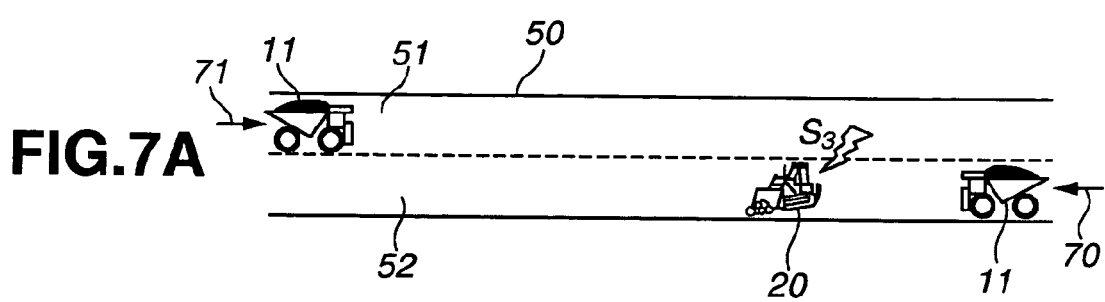
FIGS. 7A, 7B, 7C, 7D are figures for explaining processing of creating a detour course in the second embodiment.
Figure 7B:
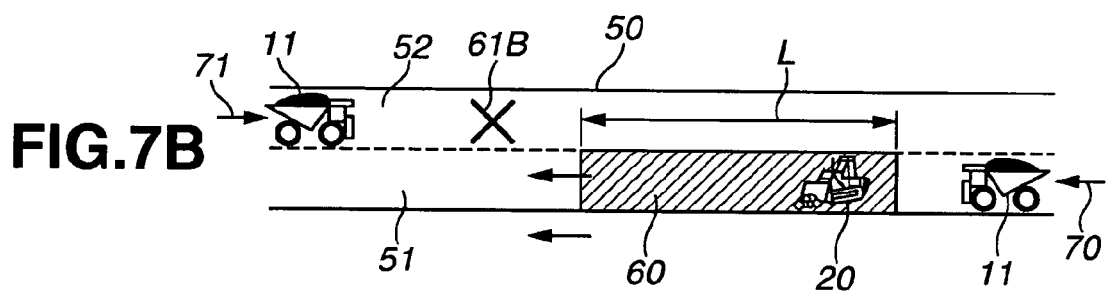
Figure 8:
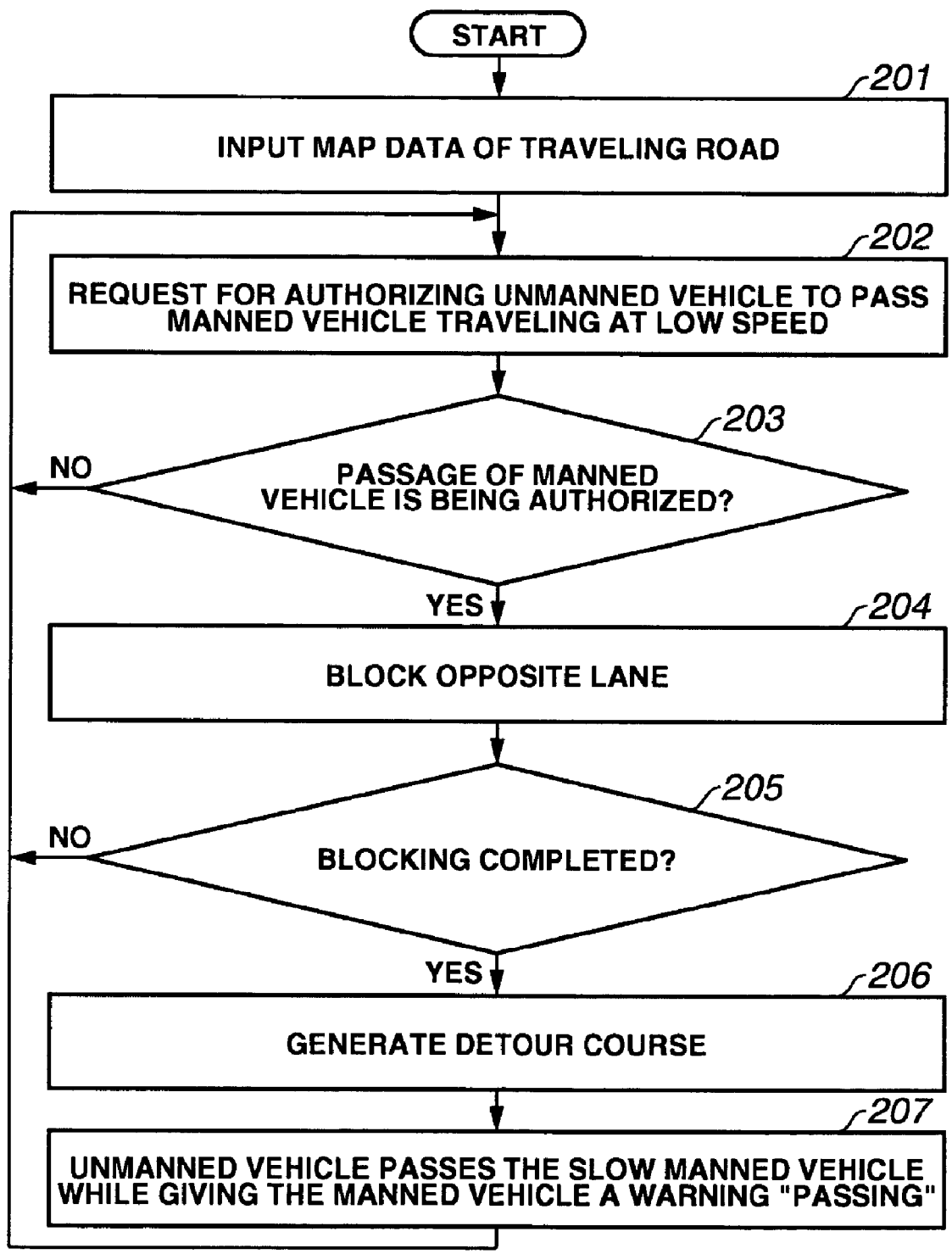
FIG. 8 is a flowchart showing the sequence of the processing of the second embodiment.

Specifically, on the basis of the positional data of the unmanned vehicle 10 and the positional data of the manned vehicle 20 which are stored in the operation data sharing device 43, the passing controller 45' computes a predicted catch up distance L which is required for the unmanned vehicle 10 to pass the manned vehicle 20, as shown in FIG. 7B. Then, the restricted area 60 is created based on the predicted catch up distance L. The restricted area 60 is region that the manned vehicle 20 can travel while the unmanned vehicle 10 passes the manned vehicle 20, and is also a region to which the unmanned vehicle 10 is prohibited from accessing when the unmanned vehicle 10 bypasses the manned vehicle 20, as with the restricted area 60 of the first embodiment. Then, on the basis of the restricted area 60, the block position 61B for stopping the unmanned vehicle 11 traveling on the opposite lane 52 is created in the same manner as in the first embodiment. The block position 61B is set such that the unmanned vehicle 10 is prevented from interfering with the unmanned vehicle 11 on the opposite lane 52 when the unmanned vehicle 10 bypasses the restricted area 60.

The predicted catch up distance L is computed based on the steepness of the traveling road 50, the difference in maximum speed between the unmanned vehicle 10 and the manned vehicle 20, current speed of the unmanned vehicle 10 and manned vehicle 20, the distance required when changing lanes, safety margin, process delay margin, and the like.

However, the restricted area 60 is sequentially updated as follows. Specifically, the position at which lane change is started is computed along with the position of the unmanned vehicle 10, as needed. Further, the block position 61B on the opposite lane 52 is computed again along with the changes of the movement of traveling speed of the manned vehicle 20, and calculated again when the process delay margin is used up.

Figure 7C:
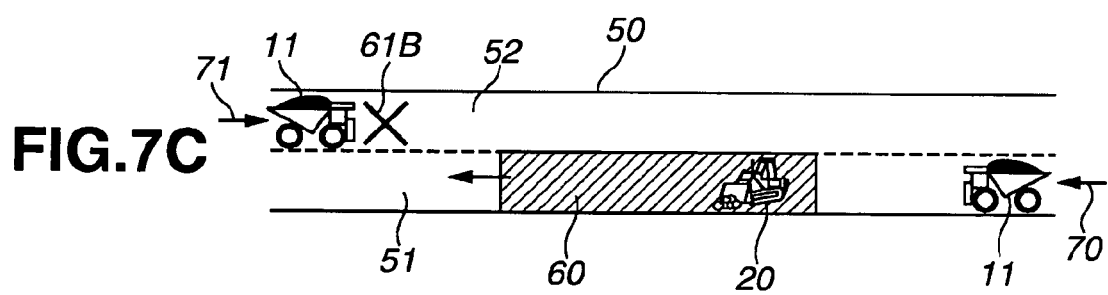

As shown in FIGS. 7B and 7C, when the manned vehicle 20 is in the middle of moving toward the left in the figures, the restricted area 60 and block position 61B sequentially move toward the left in the figures.

The unmanned vehicle operation management device 48 of the monitor station 40 transmits the data of thus created restricted area 60 and data of the block position 61B to the operation data sharing device 43.

Accordingly, the data of the restricted area 60 and of the block position 61B are stored in the operation data sharing device 43. The operation data sharing device 43 outputs these data items of the block position 61B and the like to the communication device 32. In response, the communication device 32 transmits the data items of the block position 61B and the like to the communication device 42 of each unmanned vehicle 10, 11 by means of the wireless communications S1, S2 and to the manned vehicle 20 by means of the wireless communication S3. Accordingly, the data items of the block position 61B and the like are stored in the operation data sharing device 3 of each unmanned vehicle 10,11, and the operation data sharing device 33 of the manned vehicle 20.

Once the block position 61B is created, thereafter transmission of the travel permission command for traveling in the section including the block position 61B, from the communication device 42 of the monitor station 40 to each of the unmanned vehicles traveling the opposite lane 52 is stopped (step 301).

The following processes of steps 302 to 308 are carried out in consideration of the case in which the travel permission command for traveling in the section including the block position 61B is already outputted to the unmanned vehicle from the monitor station 40.

Specifically, the unmanned vehicle operation management device 48 determines whether or not there exists an unmanned vehicle which plans to pass through the block position 61B (step 302). As a result, if there exist an unmanned vehicle (unmanned vehicle 11, for example) which plans to pass through the block position 61B, a stop request command for stopping the unmanned vehicle at the block position 61B is generated.

The unmanned vehicle operation management device 48 then outputs the generated stop request command to the communication device 42 of the station 40 via the operation data sharing device 43 of the station 40. Accordingly, the stop request command is transmitted from the communication device 42 of the monitor station 40 to the unmanned vehicle 11 on the opposite lane 52 by means of the wireless communication S2 (step 303).

The communication device 2 of the unmanned vehicle 11 receives the stop request command. The communication device 2 transmits the stop request command to the control device 5 via the operation data sharing device 3 of the vehicle 11. The control device 5 of the unmanned vehicle 11 receives the stop request command, compares the block position 61B stored in the operation data sharing device 3 with the current position of the vehicle 11 measured by the position measuring device 1, and determines whether or not the vehicle 11 can stop at the block position 61B (step 304). As a result, when the vehicle 11 can stop at the block position 61B (YES in the determination in the step 304), the control device 5 controls travel of the manned vehicle 11 so that the vehicle 11 stops at the block position 61B (step 305), transmits data indicating that the vehicle 11 can stop at the block position 61B to the monitor station 40 via the communication device 2 (step 306), and finishes the opposite lane blocking process. On the other hand, if it is determined that the vehicle 11 cannot stop at the block position 61B (NO in the determination in the step 304), the control device 5 transmits data indicating that the vehicle 11 cannot stop at the block position 61B to the monitor station 40 via the communication device 2 (step 307), and controls travel of the vehicle 11 so as to cause the vehicle 11 to directly pass through the section including the block position 61B. When it is confirmed that the vehicle 11 passes through a side of the restricted area 60 and reaches the position in which the vehicle 11 does not interfere with the unmanned vehicle 10 which tries to bypass the restricted area 60 (step 308), the opposite lane blocking process is finished. The monitor station 40, which receives in the step 307 the notification indicating that the vehicle 11 cannot stop at the block position 61B, inputs the notification into the passing controller 45'. The passing controller 45' predicts a position where the manned vehicle 20 and the unmanned vehicle 11 pass each other completely, and computes, based on this position, a restricted area for allowing the unmanned vehicle 11 to pass after passing through the restricted area 60, and the block position of a vehicle following the unmanned vehicle 11, to block the restricted area beforehand.

When it is determined in the step 302 that there is no unmanned vehicle which plans to pass through the block position 61B (NO in the determination in the step 302), the opposite lane blocking process is finished.

The opposite lane blocking process is performed in the manner described above (step 204), and when the opposite lane blocking process is finished (YES in the determination in the step 205), the unmanned vehicle operation management device 48 creates the detour course 72 by means of the course generating device 41 on the basis of the data items of the restricted area 60 and block position 61B which are stored in the operation data sharing device 43.

As with the detour course 72 described above, the detour course 72 is a traveling course which is located on the lane 51 on the restricted area 60 side, deviates from the planned traveling course 70 of an unmanned vehicle (unmanned vehicle 10) traveling behind the manned vehicle 20, and is designed so as to avoid the restricted area 60, passes through the opposite lane 52, and returns to the traveling course 70 of the vehicle 10 at a position corresponding to the block position 61B.

The unmanned vehicle operation management device 48 of the monitor station 40 transmits data of thus created detour course 72 to the operation data sharing device 43.

Accordingly, the data of the detour course 72 is stored in the operation data sharing device 43. The operation data sharing device 43 outputs the data of the detour course 72 to the communication device 32. In response, the communication device 32 transmits the data of the detour course 72 to the communication device 42 of each unmanned vehicle 10, 11 by means of the wireless communication S1, S2 and to the manned vehicle 20 by means of the wireless communication S3. Accordingly, the data of the detour course 72 is stored in the operation data sharing device 3 of the unmanned vehicle 10, 11 and in the operation data sharing device 33 of the manned vehicle 20, and the shared data of the detour course 72 is provided to all of the vehicle 10, 11, 20.

On the display screen of the display device 37 of the manned vehicle 20, there are displayed the restricted area 60, block position 61B, detour course 72, and the current position of the vehicle 20 measured by the position measuring device. Accordingly, the operator of the manned vehicle 20 can recognize that there is a possibility that the unmanned vehicle 10 passes through the detour course 72 to pass the vehicle 20 (step 206).

Once the detour course 72 is created, the unmanned vehicle operation management device 48 of the monitor station 40 transmits, to the passing controller 45' of the station 40, a command for requesting again the manned vehicle 20 to authorize the unmanned vehicle 10 to start traveling the detour course 72. In response, the passing controller 45' outputs the command for requesting for travel start authorization to the communication device 42 of the station 40. Accordingly, when the command for requesting for travel start authorization is transmitted, by means of the wireless communication S3, to the communication device 32 of the manned vehicle 20 which is passed by at the detour course 72.

The command for requesting for travel start authorization is received by the communication device 32 of the manned vehicle 20, and then transmitted to the passing controller 35' of the vehicle 20. The passing controller 35' outputs the command for requesting for travel start authorization as a display command to the display device 37. Accordingly, "travel start authorization for the detour course 72 requested (passage start authorization)" is displayed on the display screen of the display device 37 of the manned vehicle 20.

Figure 7D:
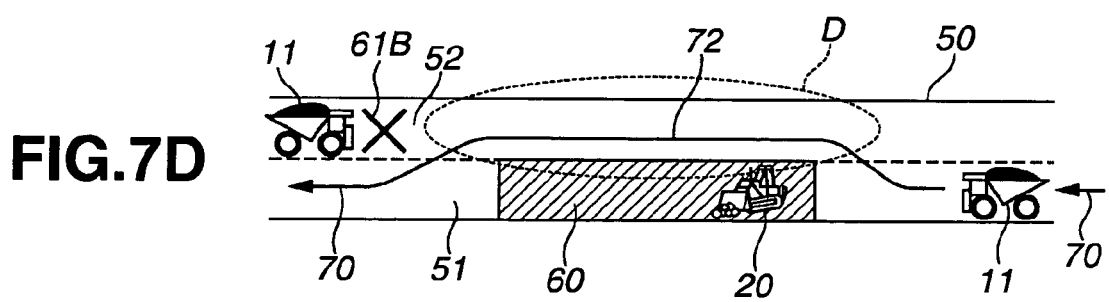

The operator of the manned vehicle 20 views "travel start authorization for the detour course 72 requested" displayed on the display screen of the display device 37, shifts the vehicle 20 to high speed traveling, and as shown in FIG. 7D, accepts the request of travel start authorization if there is no problem in which the vehicle 20 may stray onto the opposite lane 52 in order to make a turn or the like and interfere with the unmanned vehicle 10 behind in the region D, and inputs the command for travel start authorization by means of the input device 36.

The command for travel start authorization which is inputted by the input device 36 is transmitted to the passing controller 35' of the vehicle 20. The passing controller 35' outputs the travel start authorization command to the communication device 32 of the vehicle 20. In response, the travel start authorization command is transmitted from the communication device 32 of the manned vehicle 20 to the monitor station 40 by means of the wireless communication S3.

The travel start authorization command is received by the communication device 42 of the monitor station 40, transmitted to the passing controller 45' of the station 40, and outputted to the unmanned vehicle operation management device 48.

The unmanned vehicle operation management device 48 determines whether or not the travel start authorization command is inputted from the passing controller 45' (whether or not the manned vehicle 20 is authorizing start of travel on the detour course 72). As a result, if it is determined that the travel start authorization command is inputted from the passing controller 45' and the manned vehicle 20 is authorizing the start of travel on the detour course 72, the unmanned vehicle operation management device 48 transmits, to the operation data sharing device 43, a travel permission command for permitting the unmanned vehicle 10 to travel the detour course 72. The operation data sharing device 43 then outputs the travel permission command to the communication device 42 of the station 40.

It should be noted that when the travel start authorization command is not obtained from the manned vehicle 20, the unmanned vehicle operation management device 48 of the monitor station 40 waits for authorization while sequentially updating planned data of the restricted area 60, block position 61B, and detour course 72 in accordance with the position of the manned vehicle.

Moreover, in the case in which a catch up prohibition input is expressly received from the manned vehicle, or in the case in which it is determined that catch-up cannot be performed because of the changes in the traveling speed of the manned vehicle, the position of an oncoming vehicle, and other changes, the unmanned vehicle operation management device 48 of the monitor station 40 deletes the planned data items of the restricted area 60, block position 61B, and detour course 72 which are stored in the operation data sharing device 43.

When the travel start authorization command is obtained from the manned vehicle 20 and accordingly a travel permission command is generated by the monitor station 40, the travel permission command is transmitted from the communication device 42 of the monitor station 40 to the unmanned vehicle 10 by means of the wireless communication S1. Further, a notification indicating that the unmanned vehicle 10 is permitted to travel is transmitted from the communication device 42 of the monitor station 40 to the manned vehicle 20 via the wireless communication S3.

The travel permission command is transmitted by the communication device 2 of the unmanned vehicle 10. The communication device 2 transmits the travel permission command to the operation data sharing device 3 of the vehicle 10.

On the other hand, separately from the travel permission command provided from the monitor station 40, the manned vehicle mixed running controller 4 of the unmanned vehicle 10 generates the travel permission command for permitting the vehicle 10 to travel the detour course 72 on the basis of the positional data of each of the manned vehicles 20. Specifically, the reason is that, even when the travel permission command is obtained from the monitor station 40, the manned vehicle 10 should not be permitted to travel when there is a possibility that the manned vehicles 20 interfere with the unmanned vehicle 10 because of a careless movement of each of the manned vehicles 20. Furthermore, as with the first embodiment, a configuration may be made in which this process is carried out by the manned vehicle mixed running controller 34 of the manned vehicle 20.

The control device 5 of the unmanned vehicle 10 asks the operation data shared device 3 of the unmanned vehicle 10 for a travel permission command, and asks the manned vehicle mixed running controller 4 of the vehicle 10 for a travel permission command. Under the conditions that the travel permission commands are outputted from both the operation data sharing device 3 and the manned vehicle mixed running controller 4, the control device 5 performs control so that the vehicle 10 travels the detour course 72.

However, when the travel permission command is not outputted from the operation data sharing device 3 or the manned vehicle mixed running controller 4, the control device 5 controls travel of the vehicle 10 so that the vehicle 10 reduces the speed or in accordance with the circumstances so as not to pass the slow manned vehicle 20. In this manner, the control device 5 asks for the travel permission command obtained from the monitor station 40 via the operation data sharing device 3 and also asks the manned vehicle mixed running controller 4 for travel continuation permission, and at the same time continues traveling the detour course 72.

On the other hand, the notification indicating that the unmanned vehicle 10 is permitted to travel is received by the communication device 32 of the manned vehicle 20 and then transmitted to the passing controller 35' of the vehicle 20. The passing controller 35' transmits this notification as a display command to the display device 37. Accordingly, "the unmanned vehicle 10 being permitted to travel (permitted to pass)" is displayed on the display screen of the display device 37 of the manned vehicle 20, and then a warning is issued to teach the operator the unmanned vehicle 10 is passing. Such a warning can alert the operator not to cause a problem that the vehicle 20 is shifted to high-speed travel or strays onto the opposite lane 52 in order to make a turn or the like and interferes with the unmanned vehicle 10 behind in the region D (FIG. 7D) (step 207).

It should be noted that the unmanned vehicle operation management device 48 determines whether or not the unmanned vehicle 10 finishes traveling the detour course 72. When it is determined that the unmanned vehicle 10 finishes traveling on the detour course 72, the unmanned vehicle operation management device 48 of the monitor station 40 deletes the data items of the restricted area 60, block position 61B, and detour course 72 which are stored in the operation data sharing device 43.

It should be noted in the second embodiment that the monitor station 40 is used to transmit the data from the monitor station 40 to the unmanned vehicles 10, 11, or to transmit the data from the monitor station 40 the manned vehicles 20. However, a configuration is possible in which the data is transmitted directly from the unmanned vehicles 10, 11 to the manned vehicles 20 or directly from the manned vehicles 20 to the unmanned vehicles 10, 11 without passing through the monitor station 40. Specifically, the function of the monitor station 40 may be provided to the slow manned vehicle 20 so that the data is transmitted and received directly to and from the unmanned vehicles.

Third Embodiment

Detouring when an Unmanned Vehicle is Traveling at Low Speed

Hereinafter, a procedure of a process in the embodiment is described with reference the configuration diagrams of FIGS. 10A, 10B, 10C and FIGS. 11A, 11B, 11C showing the traveling path 50.

In this embodiment, the manned vehicle 20 traveling at low speed in the second embodiment is replaced with an unmanned vehicle 12 traveling at low speed, thus the explanations which overlap with those of the second embodiment are omitted.

FIGS. 10 A, 10B, 10C correspond to FIGS. 6A, 6B, 6C. The reference numerals in FIGS. 6A, 6B, 6C indicate the same components, thus the explanations thereof are omitted accordingly.

Figure 10A:
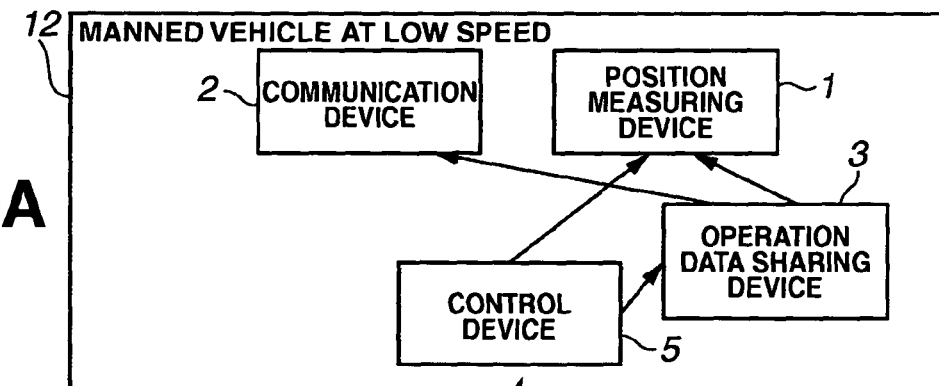
FIGS. 10A, 10B, 10C are configuration diagrams of a third embodiment.
Figure 10B:
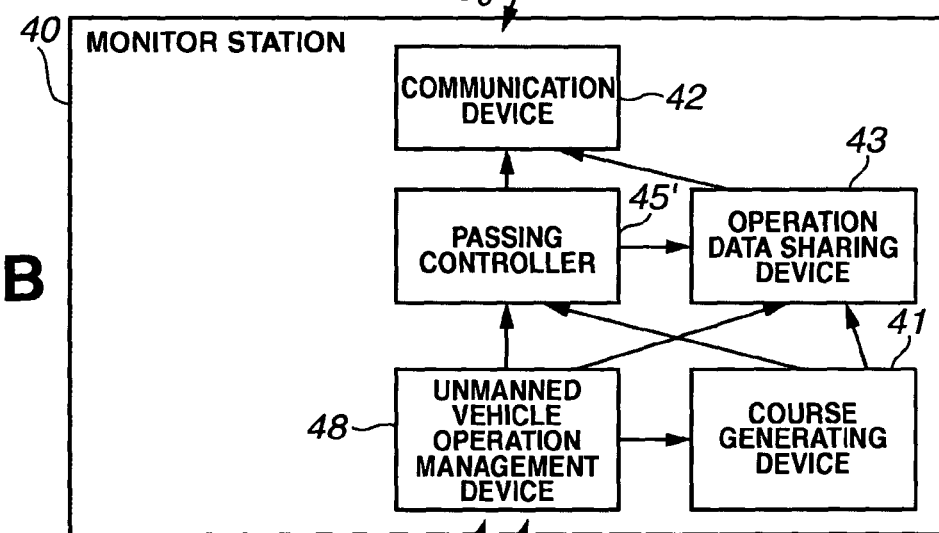
Figure 10C:
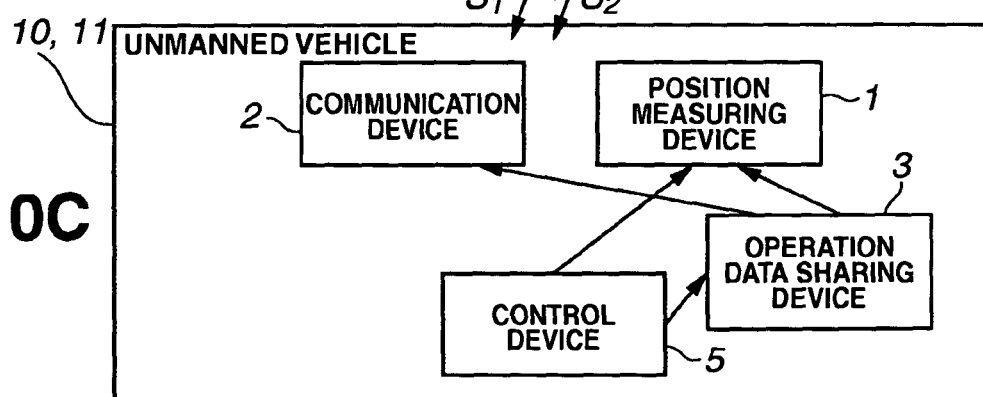

The configurations of the unmanned vehicles 10, 11 are same as the configuration shown in FIG. 6C of the second embodiment, as shown in FIG. 10C.

The configuration of the slow unmanned vehicle 12 to be passed is same as the configurations of other unmanned vehicles 10, 11 (FIG. 10C), as shown in FIG. 10A.

The configuration of the monitor station 40 is same as the configuration shown in FIG. 6B except that the manned vehicle mixed running controller 44 shown in the configuration in FIG. 6B of the second embodiment is not provided.

This embodiment assumes the case in which the unmanned vehicle 12 travels the traveling road 50 at low speed. In this embodiment, as with the second embodiment, the detour course 72 is created to pass the slow unmanned vehicle 12.

Figure 11A:
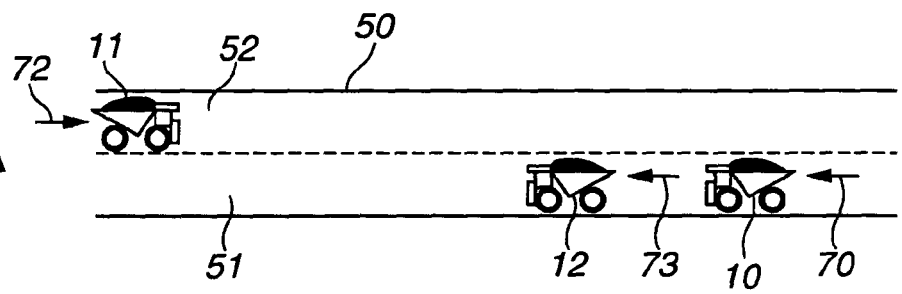
FIGS. 11A, 11B, 11C are figures for explaining processing of creating a detour course in the third embodiment.
Figure 11B:
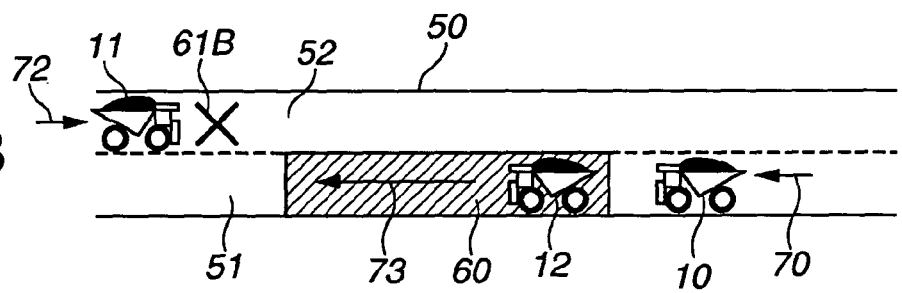

Specifically, as shown in FIG. 11A, when it is determined at the monitor station 40 that there is a possibility that the unmanned vehicle 10 may catch up with the unmanned vehicle 12 traveling the lane 51 at low speed, the block position 61B is created on the opposite lane 52, the restricted area 60 is also created, and a stop command for causing the unmanned vehicle 11 traveling the opposite lane 52 to stop at the block position 61B is provided to the unmanned vehicle 11, as shown in FIG. 11B. The restricted area 60 is created based on the data of a traveling course 73 that the unmanned vehicle 12 plans to travel.

If it is confirmed that the unmanned vehicle 11 on the opposite lane 52 securely stops at the block position 61B, the detour course 72 is created, and a travel command for causing the slow manned vehicle 12 to travel along the traveling course 73 at low speed is provided to the unmanned vehicle 12.

Figure 11C:
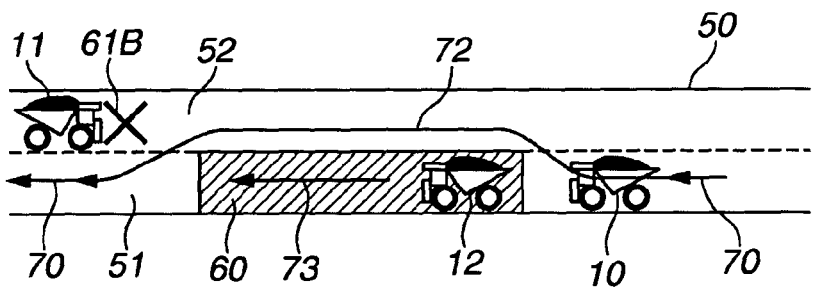

Once the detour course 72 is created, the monitor station 40 provides a travel permission command to the unmanned vehicle 10 as shown in FIG. 11C to cause the unmanned vehicle 10 to travel the detour course 72.

When the monitor station 40 determines that the unmanned vehicle 10 finished traveling the detour course 72, the monitor station 40 deletes the data of the block position 61B on the opposite lane 52 and of the detour course 72.

It should be noted that in the explanation of each of the above embodiments, the vehicle on the opposite lane 52 is assumed as the unmanned vehicle 11, but the vehicle on the opposite lane 52 may be a manned vehicle.

Moreover, in the above embodiments, the vehicle to be passed is assumed as a work vehicle or a vehicle traveling at low speed, but the vehicle to be passed may be any disabled vehicle as long as an unmanned vehicle traveling behind this vehicle has trouble traveling at high speed.

Therefore, according to the embodiments, the restricted area 60 is created based on the positional information (data of the starting point 60A and end point 60B of the work range or data of the traveling course 73) of the manned vehicle 20 (or unmanned vehicle 12) on the lane 51 which is one of the lanes 51, 52 of a two-way traffic road, the detour course 72 is created based on the information on the restricted area 60, the information on the detour course 72 is provided to each of the unmanned vehicles 10, 11, 12 and unmanned vehicles 20, the unmanned vehicle 11 (or manned vehicle) on the opposite lane 52 in the restricted area 60 is blocked by the block position 61B on the basis of the positional information of the unmanned vehicle 10 and unmanned vehicle 11 (or manned vehicle) which travel toward each other from the opposite directions so as to have the restricted area 60 therebetween, and at the same time the travel permission command is provided to the unmanned vehicle 10 traveling on the lane 51 on the restricted area 60 side, to cause the unmanned vehicle 10 to travel the detour course 72. Therefore, when causing the unmanned vehicle 10 and unmanned vehicle 11 (or manned vehicle) to travel toward each other from the opposite directions, the occurrence of interference between these vehicles can be prevented securely, and at the same time the manned vehicle 20 (or unmanned vehicle 12) or other slow vehicle, which is an obstacle to high-speed travel of the unmanned vehicle 10 behind, can be bypassed at high speed, whereby the conveyance efficiency and work efficiency can be improved while securely ensuring the safety.

What is claimed is:

1. A travel control device for vehicles, which causes unmanned vehicles, which are provided with travel controller for causing the vehicle to travel along an instructed traveling course, to travel toward each other from opposite directions on a traveling road having adjacent outward/return lanes, the travel control device comprising:
   - a monitor station for creating a restricted area that surrounds one of the manned vehicles on either one of the outward/return lanes, on the basis of positional information of the manned vehicle;
   - said monitor station creating, on the basis of the restricted area, a detour course which avoids the restricted area, passes the opposite lane, and returns to the original lane of the manned vehicle;
   - said monitor station providing each of the vehicles with information on the detour course; and
   - said monitor station providing under the condition that an authorization command for authorizing traveling the detour course is received from the manned vehicle present in the restricted area;
   - a travel permission command for permitting the unmanned vehicle, which travels a lane on a restricted area side while blocking the vehicle on a lane which is the opposite side of the restricted area, to travel the detour course, on the basis of the positional information of the vehicles traveling toward each other from the opposite directions with the restricted area therebetween,
   - wherein the travel controller of the unmanned vehicle provided with the travel permission command performs control so as to cause the vehicle to travel along the detour course in accordance with data of the instructed detour course.

2. The travel control device for vehicles according to claim 1, further comprising a keyboard for inputting the positional information of a manned vehicle present in the restricted area, wherein the monitor station creates the restricted area on the basis of the inputted positional information of the manned vehicle.

3. The travel control device for vehicles according to claim 2, wherein a keyboard is provided in a manned vehicle present in the restricted area;
   - the monitor station and each of the vehicles are provided with transmitting/receiving means for mutually transmitting and receiving information between the monitor station and the vehicle;
   - information on the restricted area is transmitted to the monitor station from the manned vehicle present in the restricted area;
   - the information on the detour course is transmitted from the monitor station to each of the vehicles; and
   - the travel permission command is transmitted from the monitor station to an unmanned vehicle traveling the lane on the restricted area side.

4. The travel control device for vehicles according to claim 1, wherein
   - the monitor station and each of the vehicles are provided with transmitting/receiving means for mutually transmitting and receiving information between the monitor station and the vehicles;
   - the information on the detour course is transmitted from the monitor station to each of the vehicles; and
   - the travel permission command is transmitted from the monitor station to the unmanned vehicle traveling the lane on the restricted area side.

5. The travel control device for vehicles according to claim 1, wherein the restricted area is an area in which a manned vehicle performs a work, an area in which a manned vehicle travels at low speed, or an area in which a disabled manned vehicle exists.

6. A travel control method for a vehicle, which causes unmanned vehicles, which are provided with travel control means for causing the vehicle to travel along an instructed traveling course in accordance with data on the instructed traveling course, to travel toward each other from opposite directions on a traveling road having adjacent outward/return lanes, the travel control method comprising the steps of:
   - creating a restricted area that surrounds a manned vehicle on either one of the outward/return lanes, on the basis of positional information of the manned vehicle;
   - creating, on the basis of the restricted area, a detour course which avoids the restricted area, passes the opposite lane, and returns to the original lane of the vehicle;
   - providing each of the vehicles with information on the detour course providing, under the condition that an authorization command to for authorizing traveling the detour course is received from the manned vehicle present in the restricted area, a travel permission command for permitting the unmanned vehicles, which travel a lane on a restricted side, to travel the course, and
   - performing control so as to cause the unmanned vehicle to travel along an instructed detour course in accordance with data on the instructed detour course.

* * * * *